United States Patent
Kleinert et al.

(10) Patent No.: US 10,569,737 B2
(45) Date of Patent: Feb. 25, 2020

(54) SYSTEM AND METHOD FOR DISENGAGING A LOCKING RETRACTOR TO PERMIT EXTRACTION OF A SEATBELT FROM THE RETRACTOR, AND FOR GENERATING A MESSAGE INDICATING THAT A LOCKING MECHANISM IN THE RETRACTOR IS ENGAGED

(71) Applicant: GM GLOBAL TECHNOLOGY OPERATIONS LLC, Detroit, MI (US)

(72) Inventors: Julie A. Kleinert, Fenton, MI (US); Paul M. Van Rooyen, Lake Orion, MI (US); Fred W. Huntzicker, Ann Arbor, MI (US); Sean T. Coughlin, Shelby Township, MI (US); Tricia E. Morrow, Grosse Pointe, MI (US); Antonio Antonucci, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 130 days.

(21) Appl. No.: 15/727,964

(22) Filed: Oct. 9, 2017

(65) Prior Publication Data
US 2019/0106082 A1 Apr. 11, 2019

(51) Int. Cl.
*B60R 22/35* (2006.01)
*B60R 22/34* (2006.01)
*B60R 22/357* (2006.01)

(52) U.S. Cl.
CPC .......... *B60R 22/35* (2013.01); *B60R 22/3416* (2013.01); *B60R 22/357* (2013.01)

(58) Field of Classification Search
CPC .... B60R 22/35; B60R 22/3416; B60R 22/357
See application file for complete search history.

(56) References Cited

U.S. PATENT DOCUMENTS

| | | | |
|---|---|---|---|
| 3,750,102 A * | 7/1973 | Okada | B60R 22/357 180/270 |
| 4,261,530 A | 4/1981 | Asai et al. | |
| 4,273,301 A * | 6/1981 | Frankila | B60R 22/42 242/378.4 |

(Continued)

FOREIGN PATENT DOCUMENTS

| | | | | |
|---|---|---|---|---|
| GB | 1349222 A * | 4/1974 | | B60R 22/04 |
| WO | WO-2013188639 A3 | 2/2014 | | |

*Primary Examiner* — Darlene P Condra

(57) ABSTRACT

A system according to the present disclosure includes a pawl actuator control module. The pawl actuator control module controls a pawl actuator of a seatbelt retractor to disengage a pawl of the seatbelt retractor from a control disc of the seatbelt retractor. The pawl actuator control module disengages the pawl of the retractor from the control disc when at least one of: a tongue of the seatbelt is disengaged from a seatbelt buckle; a button on the buckle is pressed; a manual disengagement button is pressed; an occupant is present in the seat; and a user provides an instruction to disengage the pawl via a user interface device. The seatbelt retractor allows a seatbelt to be extracted from the seatbelt retractor when the pawl is disengaged from the control disc and prevents the seatbelt from being extracted from the seatbelt retractor when the pawl is engaged with the control disc.

20 Claims, 11 Drawing Sheets

(56) References Cited

U.S. PATENT DOCUMENTS

| | | | | |
|---|---|---|---|---|
| 4,691,939 A * | 9/1987 | Sato | ................... | B60R 22/3416 280/801.1 |
| 5,681,094 A * | 10/1997 | Brown | ................. | B60N 2/2812 297/484 |
| 5,934,596 A | 8/1999 | Gorman et al. | | |
| 5,970,587 A | 10/1999 | Knox | | |
| 6,332,629 B1 * | 12/2001 | Midorikawa | ....... | B60R 22/3416 242/390.8 |
| 6,485,057 B1 * | 11/2002 | Midorikawa | ........... | B60R 21/01 280/801.1 |
| 6,616,186 B1 * | 9/2003 | Midorikawa | ........... | B60R 21/01 280/735 |
| 7,296,825 B1 * | 11/2007 | Zia | ......................... | B60R 22/48 180/268 |
| 9,150,193 B2 | 10/2015 | Vanwambeke et al. | | |
| 2002/0130545 A1 * | 9/2002 | Tanji | ....................... | B60R 22/44 297/480 |
| 2004/0195420 A1 * | 10/2004 | Schnabl | .................. | B60R 22/46 242/374 |
| 2005/0146128 A1 * | 7/2005 | Midorikawa | ........... | B60R 21/01 280/807 |
| 2007/0216214 A1 * | 9/2007 | Delventhal | ............. | B60R 22/36 297/478 |
| 2008/0174098 A1 * | 7/2008 | Takao | ..................... | B60R 22/46 280/807 |
| 2008/0303260 A1 * | 12/2008 | Jaskol | ..................... | B60R 22/48 280/801.1 |
| 2009/0261568 A1 * | 10/2009 | Ehlers | ..................... | B60R 22/41 280/806 |
| 2012/0101688 A1 * | 4/2012 | Sugiyama | ............... | B60R 21/18 701/45 |
| 2013/0334355 A1 | 12/2013 | Vanwambeke et al. | | |
| 2015/0120150 A1 * | 4/2015 | Kreder | .................... | B60N 2/06 701/49 |
| 2015/0298646 A1 * | 10/2015 | Beutler | ................ | B60R 22/357 24/633 |
| 2016/0002959 A1 * | 1/2016 | Javadzadeh | ............. | E05B 77/12 701/46 |
| 2017/0066404 A1 * | 3/2017 | Liteplo | ................ | B60R 22/347 |

* cited by examiner

SYSTEM AND METHOD FOR DISENGAGING A LOCKING RETRACTOR TO PERMIT EXTRACTION OF A SEATBELT FROM THE RETRACTOR, AND FOR GENERATING A MESSAGE INDICATING THAT A LOCKING MECHANISM IN THE RETRACTOR IS ENGAGED

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for disengaging a locking retractor to permit extraction of a seatbelt from the retractor, preventing engagement of the locking retractor under certain conditions, and generating a message indicating that a locking mechanism in the retractor is engaged.

A seatbelt assembly typically includes a seatbelt, a seatbelt buckle, and a retractor having a spool for dispensing and retracting the seatbelt. Some seatbelt retractors are equipped with a locking or ratchet mechanism that can be engaged or locked to prevent extension of the seatbelt. One such type of seatbelt retractor is an automatic locking retractor (ALR). When an ALR is engaged, the ALR prevents extraction of a seatbelt while allowing retraction of the seatbelt.

An ALR is typically used to secure a child safety seat on a vehicle seat. A user activates (i.e., engages) the ALR by fully extracting the seatbelt from the retractor when installing the child safety seat on the vehicle seat. The user then wraps the seatbelt around the child safety seat and inserts a tongue of the seatbelt into a seatbelt buckle to secure the child safety seat. Once the seatbelt is buckled, the user allows the seatbelt to retract until the belt is taut around the child safety seat. The ALR prevents the seatbelt from loosening over time and tightens the seatbelt when slack occurs, for example, as a result of a bumpy road or a shift in position of the child safety seat.

SUMMARY

A system according to the present disclosure includes a pawl, actuator control module. The pawl actuator control module controls a pawl actuator of a seatbelt retractor in a vehicle to disengage a pawl of the seatbelt retractor from a control disc of the seatbelt retractor. The pawl actuator control module disengages the pawl of the seatbelt retractor from the control disc when at least one of: a tongue of the seatbelt is disengaged from a buckle of the seatbelt; button on the seatbelt is pressed; a manual disengagement button is pressed; an occupant is present in the seat; and a user provides an instruction to disengage the pawl via a user interface device. The seatbelt retractor allows a seatbelt to be extracted from the seatbelt retractor when the pawl is disengaged from the control disc. The seatbelt retractor prevents the seatbelt from being extracted from the seatbelt retractor when the pawl is engaged with the control disc.

In one aspect, the system further includes a buckle sensor. The pawl actuator control module controls the pawl actuator to disengage the pawl from the control disc when the tongue of the seatbelt is disengaged from the seatbelt buckle of the seatbelt or the button on the seatbelt buckle is pressed.

In another aspect, the system further includes a manual disengagement sensor. The pawl actuator control module controls the pawl actuator to disengage the pawl from the control disc when the manual disengagement button is pressed.

In another aspect, the pawl actuator control module is controls the pawl actuator to disengage the pawl from the control disc when both the manual disengagement button is pressed and a transmission of the vehicle is in park.

In another aspect, the system further includes an occupant detection module that determines whether an occupant is present in the seat. The pawl actuator control module controls the pawl actuator to disengage the pawl from the control disc when an occupant is present in the seat.

In another aspect, the pawl actuator control module controls the pawl actuator to disengage the pawl from the control disc when the user provides the instruction to disengage the pawl via the user interface device.

In another aspect, the pawl actuator control module controls the pawl actuator of the seatbelt retractor to engage the pawl of the seatbelt retractor with the control disc of the seatbelt retractor when at least one of: the user provides an instruction to engage the pawl via the user interface device; and the user fully extracts the seatbelt from the seatbelt retractor.

In another aspect, the pawl actuator control controls whether power is supplied to the pawl actuator based on at least one of: whether the pawl is engaged with the control disc; and whether an ignition switch is in an ON position.

In another aspect, the system further includes a retractor sensor that detects whether the pawl is engaged. The pawl actuator control module supplies power to the pawl actuator when the pawl is engaged with the control disc and the ignition switch is in the ON position.

In another aspect, the pawl actuator control module receives a raw signal from the buckle sensor. The pawl actuator control module filters the raw signal to produce a filtered signal by removing content of the raw signal that has a frequency greater than a frequency threshold. The pawl actuator control module determines whether the tongue of the seatbelt is disengaged from the seatbelt buckle or the button on the seatbelt is pressed based on the filtered signal. The pawl actuator control module controls the pawl actuator to disengage the pawl from the control disc based on the filtered signal.

In another aspect, the pawl actuator control module adjusts the frequency threshold based on whether the vehicle is stationary.

In another aspect, when the vehicle is stationary, the pawl actuator control module sets the frequency threshold to a first frequency threshold. When the vehicle is moving, the pawl actuator control module sets the frequency to a second frequency threshold that is less than the first frequency threshold.

Another system according to the present disclosure includes a pawl sensor and a message communication module. The pawl sensor detects whether a pawl of a seatbelt retractor associated with a seat of a vehicle is engaged with a control disc of the seatbelt retractor. The seatbelt retractor allows a seatbelt to be extracted from the seatbelt retractor when the pawl is disengaged from the control disc. The seatbelt retractor prevents the seatbelt from being extracted from the seatbelt retractor when the pawl is engaged with the control disc. The message communication module generates a message indicating that the pawl is engaged with the control disc based on an input from the pawl sensor.

In one aspect, the system further includes a buckle sensor. The buckle sensor detects whether a tongue of the seatbelt is secured in a seatbelt buckle associated with the seat. The message communication module generates the message when the pawl sensor indicates that the pawl is engaged and the buckle sensor indicates that the seatbelt tongue is not secured in the seatbelt buckle.

In another aspect, the system further includes a buckle sensor and an occupant detection module. The buckle sensor detects whether a tongue of the seatbelt is secured in a seatbelt buckle associated with the seat. The occupant detection module determines whether an occupant is present in the seat. The message communication module generates the message when an occupant is present in the seat, the buckle sensor indicates that the seatbelt tongue is secured in the seatbelt buckle, and the pawl sensor switches from indicating that the pawl is disengaged to indicating that the pawl is engaged.

In another aspect, the system further includes a buckle sensor and an occupant detection module. The buckle sensor detects whether a tongue of the seatbelt is secured in a seatbelt buckle associated with the seat. The occupant detection module determines whether an occupant is present in the seat. The message communication module generates the message when an occupant is not present in the seat, the buckle sensor indicates that the seatbelt tongue is not secured in the seatbelt buckle, and the pawl sensor switches from indicating that the pawl is disengaged to indicating that the pawl is engaged.

Still another system according to the present disclosure includes a seatbelt retractor and an electrical circuit. The seatbelt retractor includes a control disc and a pawl. The seatbelt retractor allows a seatbelt to be extracted from the seatbelt retractor when the pawl is disengaged from the control disc. The seatbelt retractor prevents the seatbelt from being extracted from the seatbelt retractor when the pawl is engaged with the control disc. The electrical circuit includes a power source, a pawl actuator, and at least one of a buckle switch and a manual disengagement switch. The buckle switch closes when a tongue of the seatbelt is disengaged from the seatbelt buckle or a button of the seatbelt buckle is pressed. The manual disengagement switch closes when a manual disengagement button is pressed. The at least one of the buckle switch and the manual disengagement switch is electrically connected to the power source and the pawl actuator. The pawl actuator is disengages the pawl from the control disc when it receives power from the power source. The pawl actuator does not receive power from the power source when the at least one of the buckle switch and the manual disengagement switch is open.

In one aspect, the electrical circuit includes the power source, the pawl actuator, the buckle switch, the manual disengagement switch, and a first switch. The power source, the first switch, and the pawl actuator are connected in series; the buckle switch and the manual disengagement switch are connected in parallel with the first switch such that the first switch closes when at least one of the buckle switch and the manual disengagement switch closes.

In another aspect, the electrical circuit further includes an ignition switch that is electrically connected to the power source, the pawl actuator, and the at least one of the buckle switch and the manual disengagement switch. The ignition switch closes when the ignition switch is in an ON position. The pawl actuator does not receive power from the power source when the ignition switch is open.

In another aspect, the electrical circuit further includes a pawl switch that is electrically connected to the power source, the pawl actuator, and the at least one of the buckle switch and the manual disengagement switch. The pawl closes when the pawl is engaged with the control disc. The pawl actuator does not receive power from the power source when the pawl switch is open.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
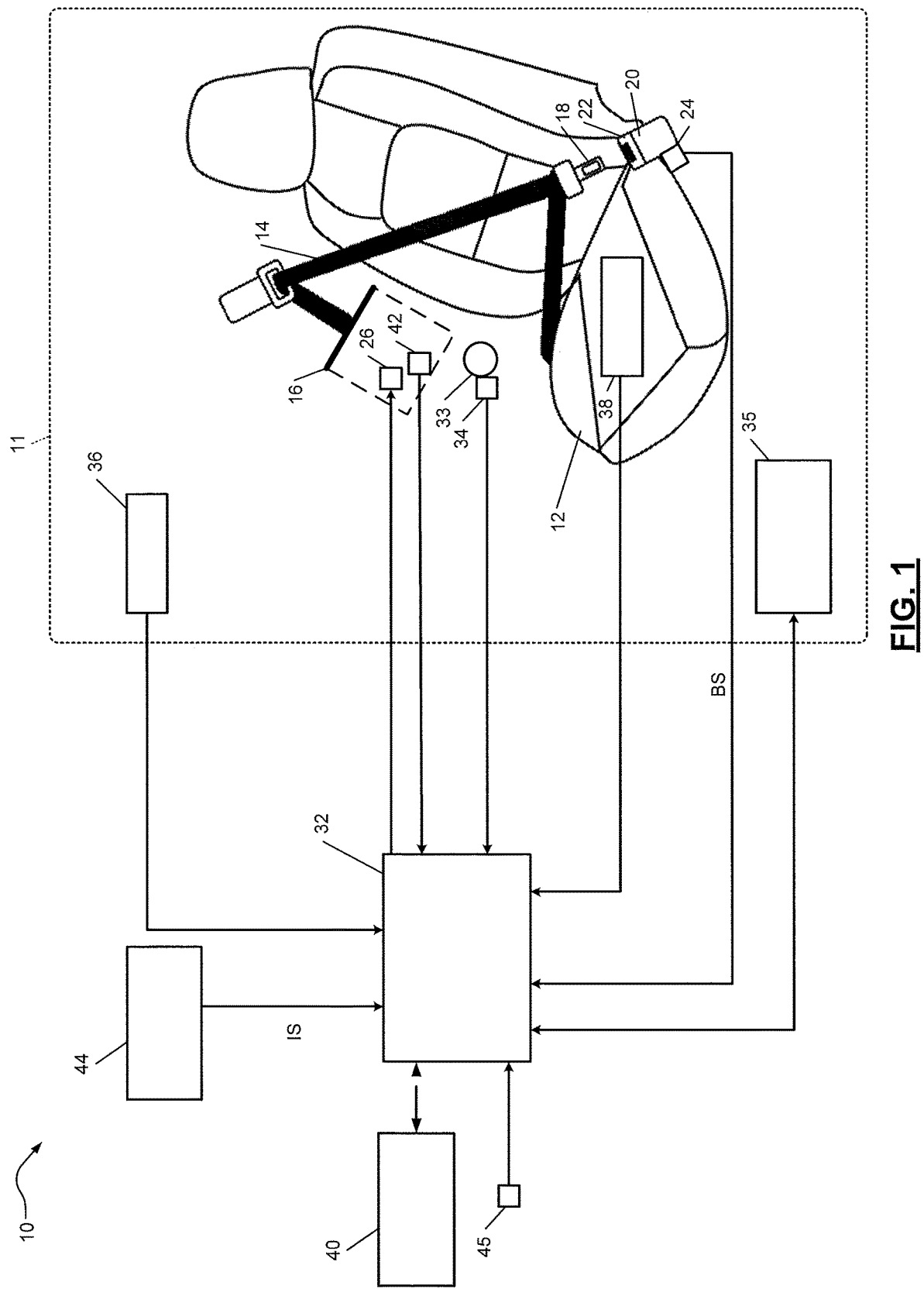
FIG. 1 is a functional block diagram of an example vehicle system including a body control module according to the principles of the present disclosure, and a perspective view of an example seat assembly according to the principles of the present disclosure.

Some locking retractors include a spool attached to a control disc. When the user fully extracts the seatbelt from the retractor, a pawl engages the control disc to prevent rotation of the spool and the control disc in the direction of seatbelt extraction. However, engagement of the pawl with the control disc does not prevent retraction of the seatbelt. Thus, until the locking retractor is deactivated (i.e., disengaged), the control disc and the spool can only rotate in one direction and the seatbelt can tighten (i.e., retract) but cannot loosen (i.e., extend).

The user typically deactivates the locking retractor by fully retracting the seatbelt into the retractor. When the user fully retracts the seatbelt, the pawl disengages from the control disc, enabling the control disc and the spool to freely rotate in either direction. The user can then use the seatbelt normally or engage the locking retractor by fully extracting the seatbelt from the retractor.

Because the locking retractor is activated when the seatbelt is fully extracted from the retractor, inadvertent engagement of the locking retractor is possible. Inadvertent engagement of the locking retractor can cause user inconvenience because the user can only deactivate the retractor by fully retracting the seatbelt. Inadvertent engagement can also cause occupant discomfort if the locking retractor is inadvertently engaged while the occupant is present in the seat because the occupant cannot extract or loosen the seatbelt while the locking retractor is engaged. Furthermore, if a seatbelt becomes taught when the locking retractor is activated, an increased force may be required to press a button on a seatbelt buckle to disengage a tongue of seatbelt from the seatbelt buckle. Since the locking retractor does not typically deactivate until the seatbelt is fully retracted, extending the seatbelt from the retractor to reduce the effort required to unbuckle the seatbelt is not typically an option. Thus, in some cases, activation of the locking retractor may increase the effort required to unbuckle a seatbelt.

A control system according to the present disclosure provides alternative ways to deactivate the locking retractor and/or prevents the locking retractor from engaging in certain situations. The control system addresses the above issues by controlling a pawl actuator to disengage a pawl of a seatbelt retractor to permit extension of a seatbelt from the retractor. In one example, the control system controls the pawl actuator to disengage the pawl of the seatbelt retractor in response to a user disengaging a tongue of the seatbelt from a buckle of the seatbelt or pressing a button to unbuckle the seatbelt. In another example, the control system controls the pawl actuator to disengage the pawl of the seatbelt retractor in response to the user pressing another button within the passenger cabin. In another example, the control system disengages the pawl of the seatbelt retractor when an occupant is detected in the seat. In another example, the control system disengages the pawl when the user provides an instruction to disengage the pawl via a user interface device. Thus, the control system may increase occupant comfort by allowing the user to deactivate the retractor to loosen the seatbelt while remaining buckled in the seatbelt. The control system may also increase user convenience by providing one or more alternative means for deactivating the retractor.

A control system according to the present disclosure may also prevent the locking retractor from activating in certain situations. In one example, the control system prevents the retractor from locking when the tongue of the seatbelt is disengaged from the seatbelt buckle. In another example, the control system does not lock the retractor when the vehicle transmission is not in park.

A control system according to the present disclosure may also generate a message indicating that the pawl is engaged based on input from a pawl sensor. The control system may communicate the message to an occupant of a vehicle via a user interface device. Additionally or alternatively, the control system may communicate the message to a third party such as emergency personnel via satellite communication network.

Referring to FIG. 1, an example vehicle system 10 includes a cabin 11 with a seat 12 having a seatbelt 14. The seatbelt 14 is dispensed from a retractor 16. For example, a user may pull the seatbelt 14 from the retractor 16 until it is an appropriate length to be buckled. The user can secure the seatbelt 14 by inserting a tongue 18 of the seatbelt 14 into a buckle 20. The user can release the seatbelt 14 or unbuckle by pressing a seatbelt button 22 on the buckle 20. The retractor 16 can then retract the seatbelt 14.

The buckle 20 can be in a buckled position or an unbuckled position. When the buckle 20 is in a buckled position, a locking member (not shown) within the buckle 20 engages the tongue 18 to secure the tongue 18 in the buckle 20. When the seatbelt button 22 is pressed, the locking member disengages the tongue 18 and a spring-loaded ejector mechanism (not shown) biases the locking member into the unbuckled position. The locking member remains in the unlocked position until the tongue 18 is inserted into the buckle 20, forcing the locking member into the buckled position to secure the tongue 18.

A buckle sensor 24, which may be a buckle switch, detects whether the tongue 18 of the seatbelt 14 is secured in the buckle 20 based on the position of the spring-loaded ejector mechanism. Alternatively, the buckle sensor 24 mat detect whether the seatbelt button 22 is pressed. The buckle sensor 24 may be a Hall effect sensor that varies its voltage output in response to a magnetic field. The buckle sensor 24 generates a buckle sensor (BS) signal indicating whether the tongue 18 of the seatbelt 14 is secured in the buckle 20 and/or whether the seatbelt button 22 is pressed.

The retractor 16 is a locking retractor and includes a pawl actuator 26, which may be a solenoid or a servo motor. With brief additional reference to FIGS. 3A and 3B, the pawl actuator 26 moves or pivots a pawl 28 about a pivot point 29 to engage the pawl 28 with a control disc 30 or disengage the pawl 28 from the control disc 30. When the pawl 28 is engaged with the control disc 30, the seatbelt 14 can be retracted, but not further extracted. That is, it can be tightened, but not loosened. When the pawl 28 is disengaged, the seatbelt 14 can be freely extracted or retracted. The user engages the pawl 28 by fully extracting the seatbelt 14. The user disengages the pawl 28 by disengaging the seatbelt tongue 18 from the buckle 20 or pressing the seatbelt button 22 on the buckle 20 of the seatbelt 14. As discussed above, the buckle sensor 24 detects whether the tongue 18 is secured in the buckle 20 or when the seatbelt button 22 is pressed.

With continued reference to FIG. 1, the output of the buckle sensor 24 is an input to a body control module (BCM) 32. The BCM 32 controls the pawl actuator 26 to disengage the pawl 28 from the control disc 30 when the tongue 18 of the seatbelt 14 is secured in the buckle 20 or the seatbelt button 22 is pressed. Thus, the user can deactivate the locking mechanism of the retractor 16 by disengaging the tongue 18 from the buckle 20 or pressing the seatbelt button 22 rather than fully retracting the seatbelt 14 into the retractor. In various implementations, the BCM 32 may only control the pawl actuator 26 to engage the pawl 28 when the tongue 18 is secured in the buckle 20 or the seatbelt button 22 is not pressed. The BCM 32 determines when the tongue 18 is removed from the buckle 20 or the seatbelt button 22 is pressed based on the input received from the buckle sensor 24.

A manual disengagement button 33 is disposed within the cabin 11. The manual disengagement button 33 may be positioned so that it is in reach of an occupant of the seat 12, for example, on trim of the vehicle. A manual disengagement switch or sensor 34 generates a manual disengagement sensor signal (MDS signal) indicating whether the manual disengagement button 33 is pressed. The output of the manual disengagement sensor 34 is an input to the BCM 32.

The BCM 32 controls the pawl actuator 26 to disengage the pawl 28 from the control disc 30 when the manual disengagement button 33 is pressed. Thus, the occupant can deactivate the locking mechanism by pressing the manual disengagement button 33 rather than fully retracting the seatbelt 14 into the retractor. The occupant can also deactivate the locking mechanism without pressing the seatbelt button 22 to disengage the tongue 18 from the buckle 20 (i.e., without removing the seatbelt 14). In various implementations, the user can also use the manual disengagement button 33 to engage the locking mechanism, for example, by toggling the manual disengagement button 33 into an "off" position.

A user interface device (UID) 35, such as a touchscreen or a button, is disposed within the cabin 11. The output of the UID 35 is an input to the BCM 32. The UID 35 allows the user to control the pawl actuator 26 to permit or prevent extension of the seatbelt 14. Thus, the user can disengage the pawl 28 from the control disc 30 by interacting with the UID 35 to generate an instruction to deactivate the locking mechanism of the retractor 16. When the BCM 32 receives this instruction from the UID 35, the BCM 32 controls the pawl actuator 26 to disengage the pawl 28 from the control disc 30. In various implementations, the user may also interact with the UID 35 to issue a command to engage the pawl 28 with the control disc 30 to prevent extension of the seatbelt 14.

Additionally or alternatively, the BCM 32 may disengage the pawl 28 from the control disc 30 based on an input from an occupant detection system that includes a camera 36 and a weight pad 38 disposed in the cabin 11. The camera 36 generates a digital image of the seat 12 and any objects in the seat 12. The weight pad 38 measures the weight of objects in the seat 12. The camera 36 and weight pad 38 may be used together or separately to determine whether the seat 12 is occupied by a human (not in a child safety seat) or a child safety seat (with or without a child), as described in more detail below. Outputs of the camera 36 and the weight pad 38 are inputs to the BCM 32.

The BCM 32 determines whether the seat 12 is occupied by a human (not in a safety seat) or a child safety seat (with or without a child) based on the input from the camera 36 and/or the weight pad 38. The BCM 32 may control the pawl actuator 26 to disengage the pawl 28 from the control disc 30 when the seat 12 is occupied by a human. In various implementations, the BCM 32 controls the pawl actuator 26 to engage the pawl 28 with the control disc 30 when the BCM 32 determines that the seat 12 is occupied by a child safety seat.

The BCM 32 may also generate a message indicating that the locking mechanism of the retractor 16 is activated when the pawl 28 is engaged with the control disc 30. The BCM 32 may determine whether the pawl 28 is engaged with the control disc 30 or disengaged from the control disc 30 based on an input from a pawl switch or sensor 42. The pawl sensor 42 detects the position of the pawl 28 and generates a pawl sensor (PS) signal indicating the position of the pawl 28.

The BCM 32 may communicate the message to the user of the vehicle system 10 via the UID 35. For example, the BCM 32 controls the UID 35 to generate a visual message (e.g., text, a light, and/or a symbol), an audible message (e.g., a chime), and/or a tactile message (e.g., vibration) indicating that the locking mechanism of the retractor 16 is activated. The user (i.e., a driver or another occupant of the vehicle) may interact with the UID 35 to acknowledge the message, in which case the BCM 32 may disable (e.g., stop generating) the message.

Additionally or alternatively, the BCM 32 may communicate the message to a third party via a satellite communication network 40. For example, the BCM 32 may send an alert to a vehicle assistance provider or emergency personnel. The BCM 32 may also send an alert to the driver's mobile phone (e.g., text or email). The satellite communication network 40 may also be an input to the BCM 32, such as when a third party confirms receipt of the message.

The vehicle system 10 further includes an ignition switch or sensor 44. The output of the ignition switch 44 is an input to the BCM 32. The ignition switch 44 generates an ignition switch (IS) signal indicating whether the ignition switch 44 is in an ON position or an OFF position. When the ignition switch 44 is in the OFF position, the BCM 32 may not control the pawl actuator 26 to engage or disengage the pawl 28. Thus, the ignition switch 44 may be used as an input to the BCM 32 to reduce parasitic currents when the vehicle is off.

The vehicle system 10 further includes a gear selector sensor 45. The output of the gear selector sensor 45 is an input to the BCM 32. The gear selector sensor 45 generates a gear selector sensor (GSS) signal that is used to indicate whether the vehicle is in park. In some configurations, the BCM 32 may only control the pawl actuator 26 to engage the pawl 28 while the vehicle is in park and not after the vehicle is moved out of park.

In some configurations, the BCM 32 may only control the pawl actuator 26 to disengage the pawl 28 when the manual disengagement button 33 is pressed if the vehicle is in park, for example, when the manual disengagement button 33 could be reached by a child in a child safety seat. However, in other configurations, the BCM 32 may permit disengagement of the pawl 28 when the manual disengagement button 33 is pressed and the vehicle is not in park. This configuration may be useful, for example, when an occupant in the seat 12 inadvertently activates the locking mechanism. The locking mechanism can then be deactivated by pressing the manual disengagement button 33 without the occupant removing the seatbelt 14.

Figure 2:
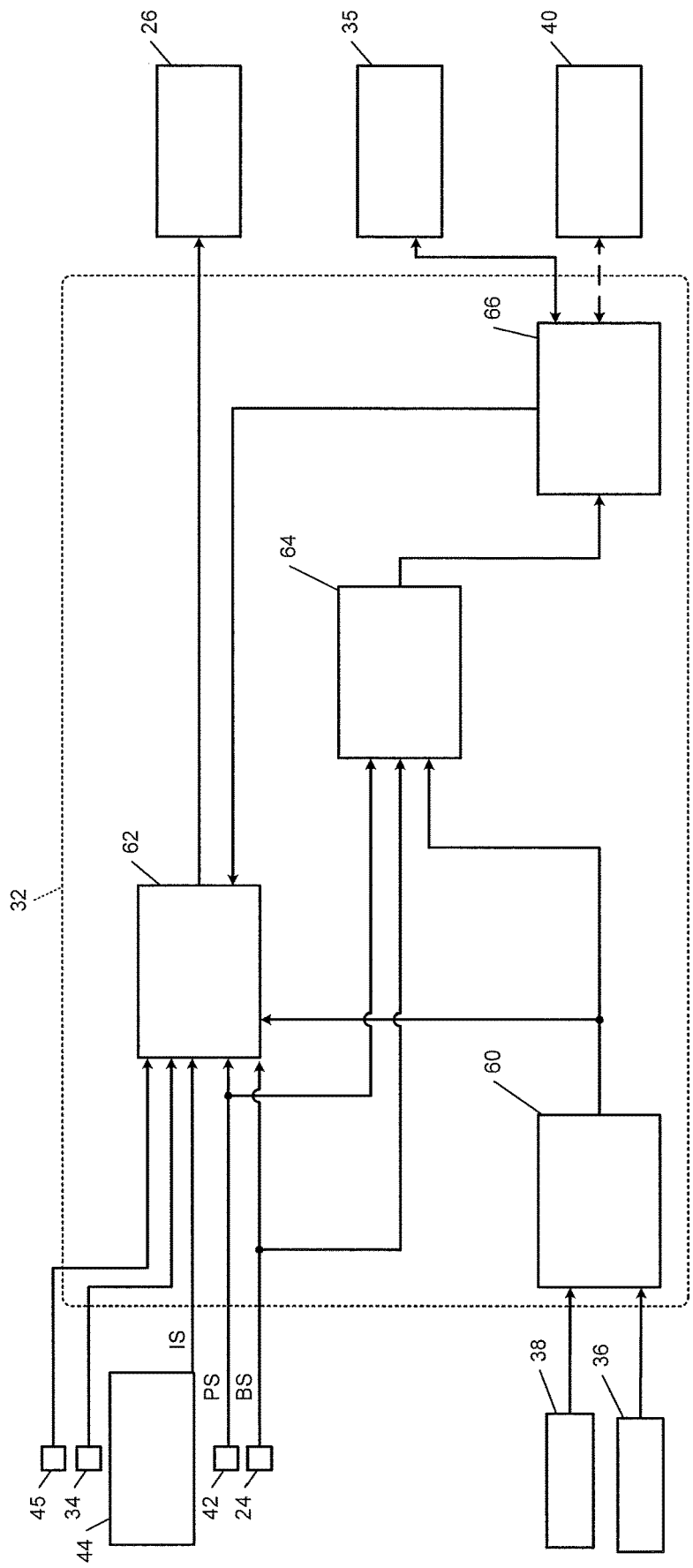
FIG. 2 is a functional block diagram of the body control module of FIG. 1.

Referring now to FIG. 2, an example implementation of the BCM 32 includes an occupant detection module 60, a pawl actuator control module 62, a pawl engagement detection module 64, and a message communication module 66. The occupant detection module 60 determines whether an occupant is present on the seat 12 based on inputs from one or both of the camera 36 and the weight pad 38. In various implementations, the occupant detection module 60 may differentiate between an unoccupied state, an object-occupied state (e.g., child seat-occupied), and a human-occupied state (e.g., human-occupied without a child seat).

In one example, the occupant detection module 60 detects edges of an object in the image generated by the camera 36 and determines the size and/or shape of the profile of the object based on the detected edges. The occupant detection module 60 detects object edges at locations in the image where the change in the brightness of the image is greater than a predetermined value. The occupant detection module 60 determines the length of the edges and/or the distances between the edges based on a predetermined relationship between dimensions in the image and actual dimensions. The occupant detection module 60 determines that the object is a child safety seat when the size and/or shape of the profile match, or are within a predetermined range of, a standard size and/or shape of a child safety seat. The occupant detection module 60 determines that the object is a person when the size and/or shape of the profile match, or are within a predetermined range of, the size and/or shape of a person that is not required to use a child safety seat under government regulations.

In another example, the occupant detection module 60 estimates the height and/or circumference of someone or something present on the seat 12. The occupant detection module 60 then determines whether the estimated height and/or circumference correlate with predetermined ranges corresponding to human occupant, an object (e.g., child safety seat), or unoccupied. The camera 36 may alternatively be an infrared thermography camera, and the occupant detection module 60 may use the output of the camera 36 to distinguish between a human occupant, an object, and no occupant based on thermal imaging.

In another example, the occupant detection module 60 determines that an object in the seat 12 is a child safety seat when the weight of the object as measured by the weight pad 38 is equal to, or within a predetermined range of, a standard weight of a child safety seat. The occupant detection module 60 determines that an object in the seat 12 is a person when the weight of the object is equal to, or within a predetermined range of, a standard weight of a person that is not required to use a child safety seat under government regulations. In various implementations, the occupant detection module 60 determines that an object in the seat 12 is a person or a child safety seat only when the input received from both the camera 36 and the weight pad 38 satisfy the criteria discussed above.

In another example, the occupant detection module 60 determines whether the seat 12 is occupied by a human based on predetermined weight categories. For example, weight range near zero corresponds to the seat 12 being unoccupied, a low weight range (e.g., a weight greater than a first threshold and less than a second threshold) corresponds to a safety seat, and a high weight range (e.g., a weigh greater than a third threshold) corresponds to a human occupant. The occupant detection module 60 may use the camera 36 alone, the weight pad 38 alone, or both the camera 36 and weight pad 38 to detect the presence of a human occupant or a child safety seat on the seat 12.

The pawl actuator control module 62 controls the pawl actuator 26 to control whether the seatbelt 14 can be extended from the retractor 16. To permit extension of the seatbelt 14 from the retractor 16, the pawl actuator control module 62 controls the pawl actuator 26 to disengage the pawl 28 from the control disc 30. To prevent extension of the seatbelt 14 from the retractor 16, the pawl actuator control module 62 controls the pawl actuator 26 to engage the pawl 28 with the control disc 30. The pawl actuator control module 62 controls the pawl actuator 26 based on inputs from the ignition switch 44, the pawl sensor 42, the buckle sensor 24, the manual disengagement sensor 34, the gear selector sensor 45, the occupant detection module 60, the UID 35, and/or the satellite communication network 40.

The pawl actuator control module 62 may also control whether power is supplied to the pawl actuator 26. The pawl actuator control module 62 may not supply power to the pawl actuator 26 when the ignition switch 44 is in the OFF position. In various implementations, the pawl actuator control module 62 does not supply power to the pawl actuator 26 when the pawl sensor 42 indicates that the pawl 28 is not engaged with the control disc 30.

The pawl actuator control module 62 controls the pawl actuator 26 to disengage the pawl 28 from the control disc 30 when the buckle sensor 24 indicates that the tongue 18 is disengaged from the buckle 20 and/or the seatbelt button 22 of the seatbelt 14 is pressed. Additionally or alternatively, the pawl actuator control module 62 controls the pawl actuator 26 to disengage the pawl 28 from the control disc 30 when the manual disengagement sensor 34 indicates that the manual disengagement button 33 is pressed. Additionally or alternatively, the pawl actuator control module 62 controls the pawl actuator 26 to disengage the pawl 28 from the control disc 30 when the occupant detection module 60 determines that the seat 12 is occupied by a human. Additionally or alternatively, the pawl actuator control module 62 controls the pawl actuator 26 to disengage the pawl 28 from the control disc 30 in response to a command from the UID 35 or the satellite communication network 40. For example, input from the UID 35 may include a command from the driver to disengage the pawl 28 from the control disc 30. Input from the satellite communication network 40 may include a command from the third party to disengage the pawl 28 from the control disc 30.

The pawl actuator control module 62 applies a low-pass filter to some or all of the raw input signals to produce filtered signals. Thus, the pawl actuator control module 62 removes the content of raw signals that have frequencies greater than a frequency threshold. For example, when the pawl actuator control module 62 applies the low-pass filter to the raw BS signal generated by the buckle sensor 24, the pawl actuator control module 62 removes the high frequency content of the raw BS signal (i.e., the content of the raw BS signal having a frequency that exceeds the frequency threshold). Thus, the BCM 32 does not disengage the pawl 28 from the control disc 30 when the seatbelt button 22 is only briefly pressed.

The pawl actuator control module 62 determines whether the vehicle is stationary based on the speed of the vehicle. When the vehicle is stationary, the pawl actuator control module 62 uses a first frequency threshold when applying the low-pass filter. When the vehicle is in motion, the pawl actuator control module 62 uses a second frequency threshold when applying the low-pass filter. The second frequency threshold is less than the first frequency threshold. Thus, the pawl actuator control module 62 less sensitive when the vehicle is in motion to reduce false signals due to vehicle vibration. The first and second frequency thresholds may be predetermined.

The pawl engagement detection module 64 determines whether the pawl 28 is engaged with the control disc 30 and/or whether such engagement is undesired, based on inputs from the pawl sensor 42, the buckle sensor 24, and/or the occupant detection module 60. The pawl engagement detection module 64 determines that the pawl 28 is engaged with the control disc 30 when the pawl sensor 42 indicates that the pawl 28 is engaged with the control disc 30. The pawl engagement detection module 64 determines that the pawl engagement is undesired when the buckle switch 24 indicates that the tongue 18 of the seatbelt 14 is not secured in the buckle 20. Additionally or alternatively, the pawl engagement detection module 64 may diagnose equipment problems, such as a broken wire in the buckle switch 24, when the pawl sensor 42 indicates that the pawl 28 is engaged with the control disc 30 and the buckle switch 24 indicates that the tongue 18 of the seatbelt 14 is not secured in the buckle 20.

The pawl engagement detection module 64 may also determine that pawl engagement is undesired when the pawl sensor 42 indicates a change in state of engagement of the pawl 28 with the control disc 30. For example, the pawl engagement detection module 64 may determine that pawl engagement is undesired when the seat 12 is unoccupied, the buckle sensor 24 indicates that the tongue 18 of the seatbelt 14 is disengaged from the buckle 20, and the pawl sensor 42 indicates that the pawl 28 changes from being disengaged from the control disc 30 to being engaged with the control disc 30. In another example, the pawl engagement detection module 64 determines that pawl engagement is undesired when the seat 12 is occupied by a person (not a child seat), the buckle sensor 24 indicates that the tongue 18 of the seatbelt 14 is secured in the buckle 20, and the pawl sensor 42 indicates that the pawl 28 changes from being disengaged from the control disc 30 to being engaged with the control disc 30.

Output from the pawl engagement detection module 64 is an input to the message communication module 66. The message communication module 66 generates a message indicating that the pawl 28 is engaged with the control disc 30 when the pawl engagement detection module 64 determines that the pawl 28 is engaged with the control disc 30 and/or that such engagement is undesired. The message communication module 66 may communicate the message to an occupant of the vehicle system 10 by controlling the UID 35. The message communication module 66 may communicate the message to a third party such as emergency personnel by sending the message to the third party via the satellite communication network 40. Although the message communication module 66 is shown as a single module, it may also be a UID control module (not shown) and satellite communication module (not shown) that are separate and distinct from each other.

Figure 3A:
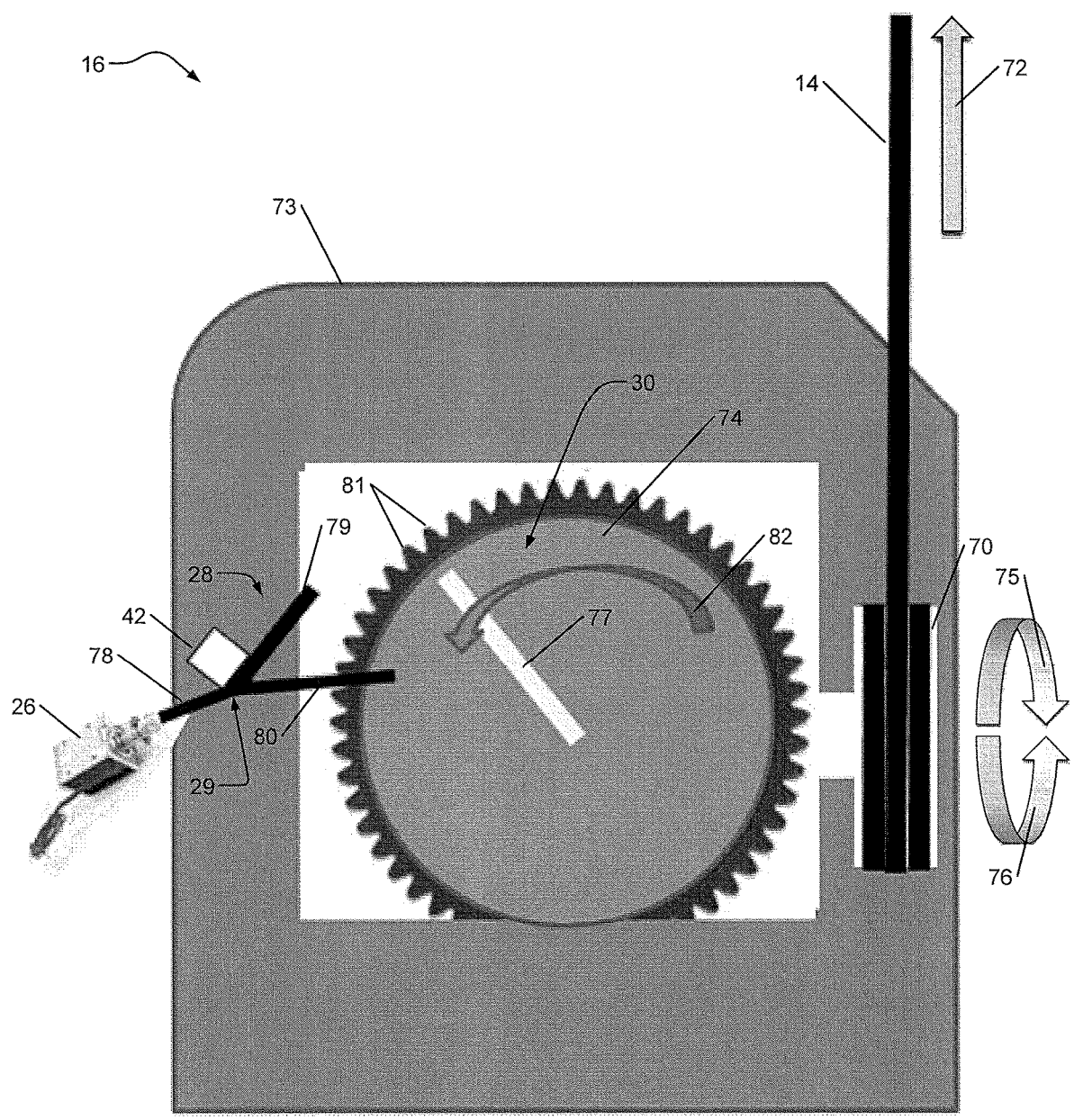
FIG. 3A is a schematic diagram of a locking retractor according to the principles of the present disclosure in a disengaged state.
Figure 3B:
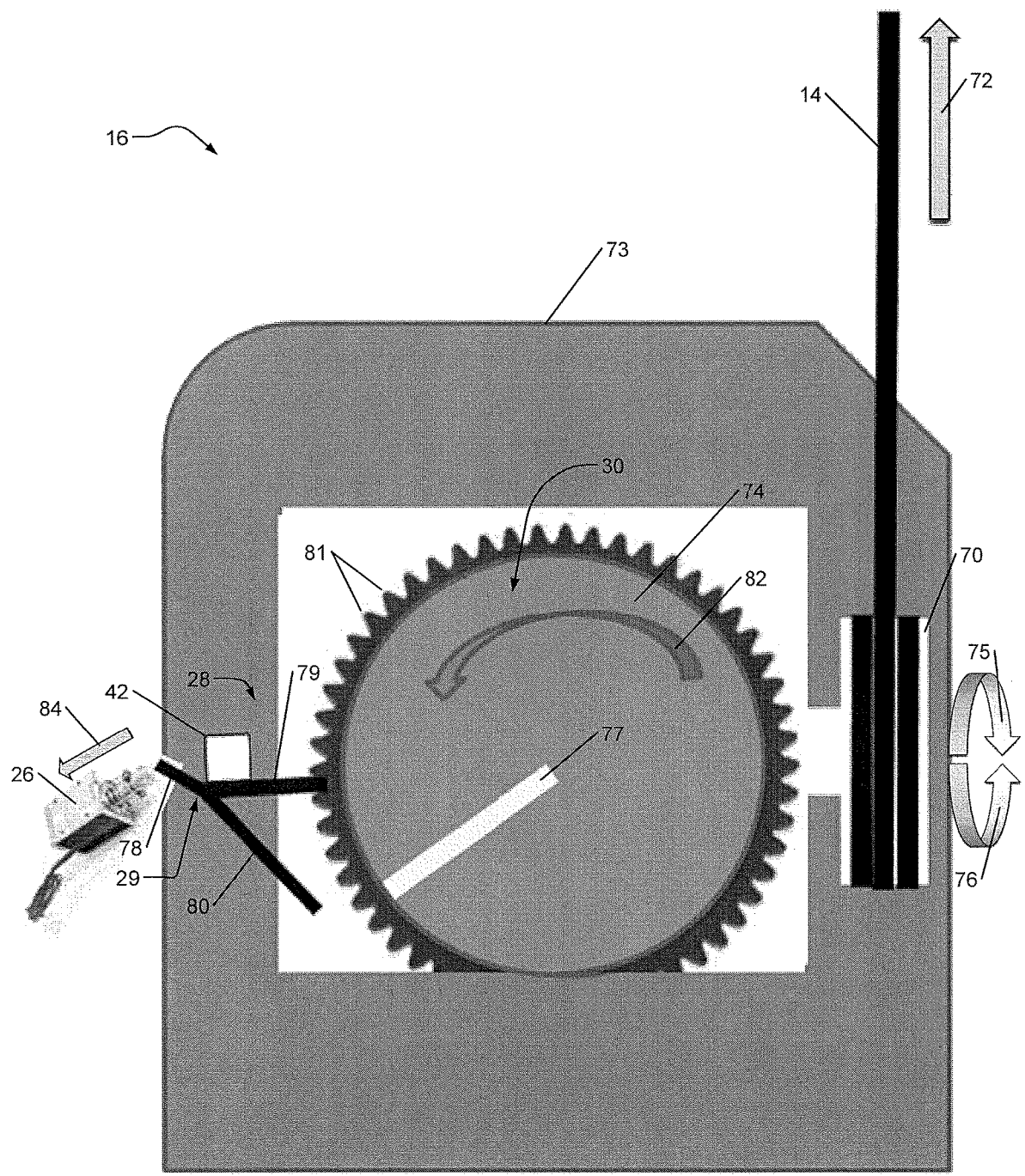
FIG. 3B is a schematic diagram of the locking retractor of FIG. 3A in an engaged state.

FIGS. 3A and 3B illustrate an example implementation of the retractor 16 in its disengaged and engaged states, respectively. The retractor 16 is used to store the seatbelt 14 when the seatbelt 14 is not in use and to dispense the seatbelt 14 for use. More specifically, the seatbelt 14 is wound around a spool 70 when it is not in use. To dispense the seatbelt 14, the user pulls the seatbelt 14 away from the retractor 16 in an extension direction 72. As the seatbelt 14 is dispensed, the spool 70 rotates with respect to a retractor frame 73 of the retractor 16 in a first direction 75.

To retract the seatbelt 14, the user releases the tongue 18 of the seatbelt 14 from the buckle 20 (shown in FIG. 1) by pressing the seatbelt button 22 on the buckle 20 and allows the seatbelt 14 to return to the retractor 16. The spool 70 may be connected to a spring (not shown) that automatically returns the seatbelt 14 to the retractor 16 and winds the seatbelt 14 around the spool 70. The spool 70 rotates in a second direction 76 opposite the first direction 75 as the seatbelt 14 is retracted.

The spool 70 is operably connected to the control disc 30 such that, when the pawl 28 is engaged with the control disc 30, the control disc 30 prevents rotation of the spool 70 in the first direction 75 while allowing rotation of the spool 70 in the second direction 76. The control disc 30 includes a body 74 and a raised feature 77 projecting from a first plane of the body 74 in a direction coming out of the page as shown in FIGS. 3A and 3B. The control disc 30 is rotatable with respect to the retractor frame 73. The control disc 30 rotates in a third direction 82 when the spool 70 rotates in the first direction 75 corresponding to seatbelt extension. The control disc 30 rotates in a fourth direction opposite of the third direction 82 when the spool 70 rotates in the second direction 76 corresponding to seatbelt retraction.

The pawl 28 is connected to the pawl actuator 26 and is movable or pivotable between its engaged and disengaged positions by the pawl actuator 26. The pawl sensor 42 is disposed proximate to the pawl 28 to detect whether the pawl 28 is engaged or disengaged with the control disc 30. The pawl 28 includes an actuating arm 78, an engagement arm 79, and a control arm 80. The actuating arm 78 is coupled to the pawl actuator 26 so that linear movement of the pawl actuator 26 causes the pawl 28 to pivot about the pivot point 29. The engagement arm 79 lies in the first plane along with the body 74 of the control disc 30. The control arm 80 lies in a second plane parallel to the first plane and offset from the first plane in the direction of the raised feature 77 of the control disc 30.

When the seatbelt 14 is fully retracted, the pawl 28 is disengaged from the control disc 30 as shown in FIG. 3A. More specifically, the engagement arm 79 of the pawl 28 is disengaged from teeth 81 on the control disc 30. As a result, the control disc 30 is allowed to rotate in the third direction 82 or the fourth direction, and therefore the spool 70 is allowed to rotate in the first direction 75 or the second direction 76. Thus, the seatbelt 14 may be retracted into the retractor 16 or extended from the retractor 16 when the pawl 28 is disengaged from the control disc 30. The pawl 28 may be biased in the disengaged position by, for example, a spring (not shown).

As the user extends the seatbelt 14 in the extension direction 72, the spool 70 rotates in the first direction 75 and the control disc 30 rotates in the third direction 82. When the seatbelt 14 is almost fully extended (e.g., when the length of the seatbelt 14 remaining on the spool 70 is less than or equal to 100 millimeters (mm)), the raised feature 77 of the control disc engages the control arm 80 of the pawl 28. Engagement of the raised feature 77 with the control arm 80 causes the pawl 28 to engage the control disc 30 as shown in FIG. 3B. More specifically, the engagement arm 79 of the pawl 28 engages the teeth 81 on the control disc 30. When this occurs, the pawl 28 prevents rotation of the control disc 30 in the third direction 82 while allowing rotation of the control disc 30 in the fourth direction. Thus, when the pawl 28 engages the control disc 30, the retractor 16 prevents extension of the seatbelt 14 while allowing retraction of the seatbelt 14.

The engagement arm 79 of the pawl 28 remains engaged with the teeth 81 on the control disc 30 until the engagement arm 79 is moved to the disengaged position by the pawl actuator 26. The BCM 32 (FIGS. 1 and 2) controls the pawl actuator 26 to move the pawl 28 into the disengaged position based on inputs from the buckle sensor 24, the manual disengagement sensor 34, the camera 36, the weight pad 38, the UID 35, and the gear selector sensor 45. The pawl actuator 26 disengages the pawl 28 from the teeth 81 on the control disc 81 by moving in a fifth direction 84, which causes the pawl 28 to pivot about the pivot point 29 from the engaged position shown in FIG. 3B to the disengaged position shown in FIG. 3A.

Figure 4A:
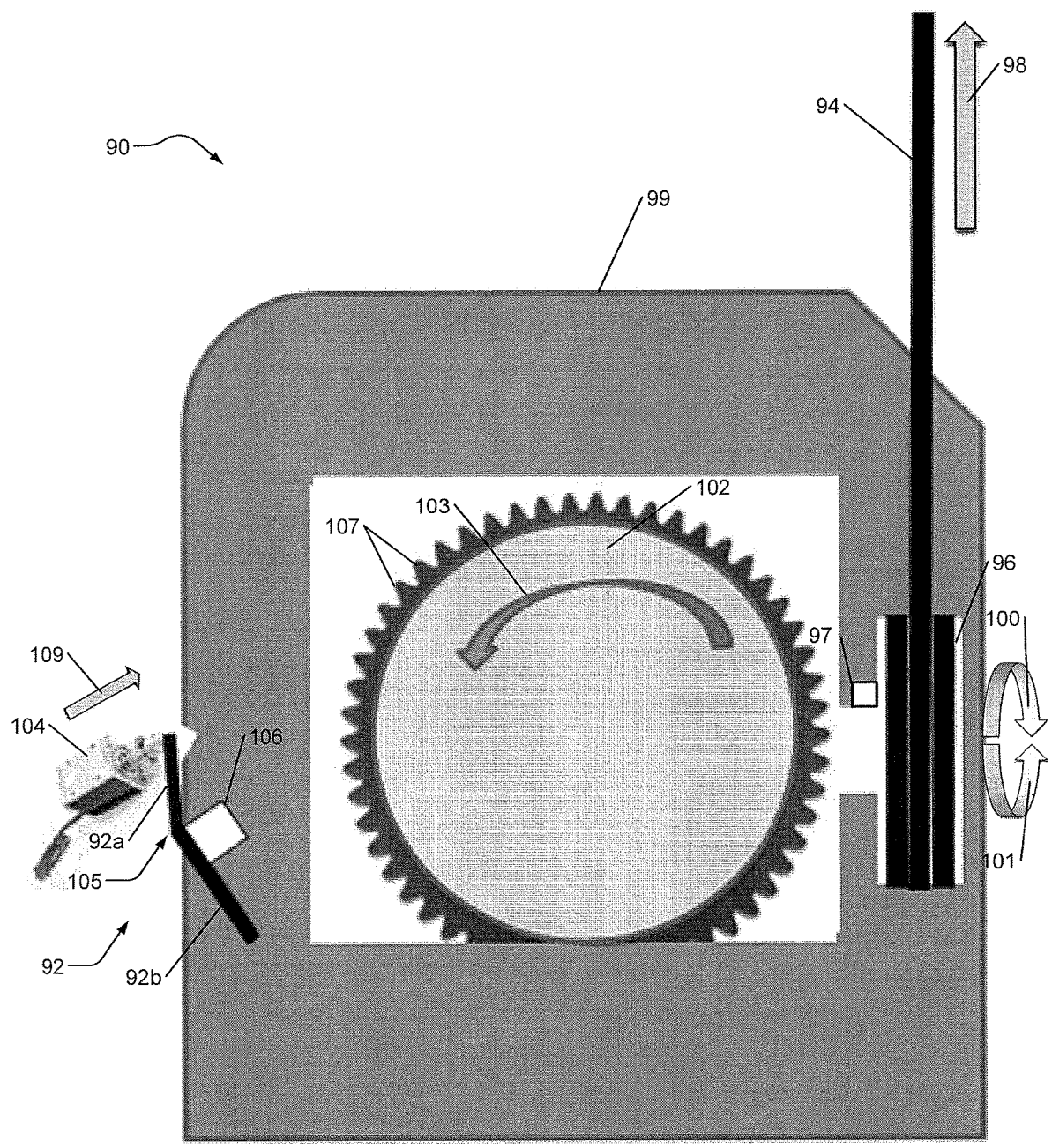
FIG. 4A is a schematic diagram of another seatbelt retractor according to the principles of the present disclosure in a disengaged state.
Figure 4B:
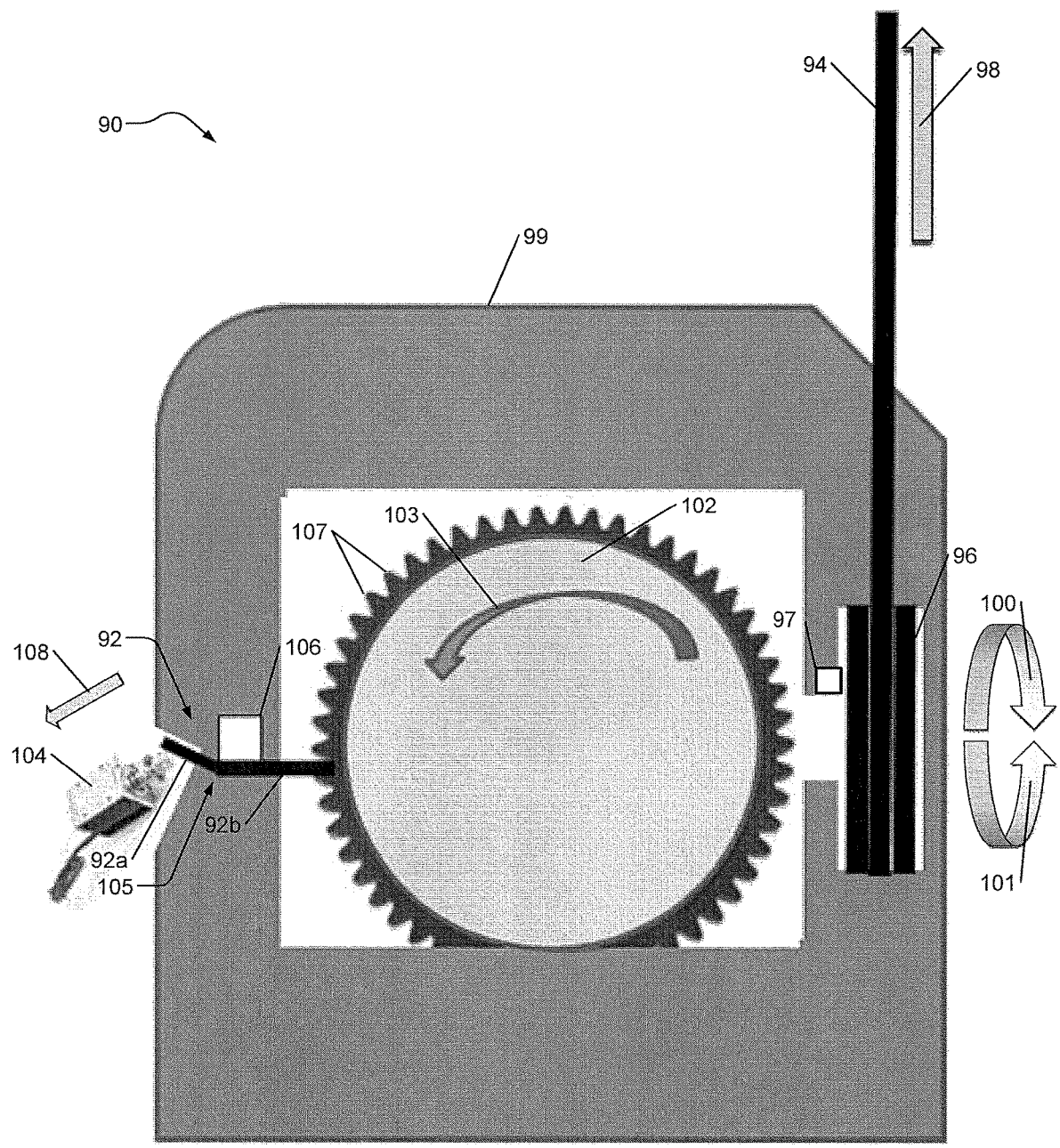
FIG. 4B is a schematic diagram of the seatbelt retractor of FIG. 4A in an engaged state.

FIGS. 4A and 4B illustrate an example implementation of a retractor 90 in its disengaged and engaged states, respectively. The retractor 90 may be used in place of the retractor 16. The retractor 90 is used to store a seatbelt 94 when it is not in use and dispense the seatbelt 94 for use. More specifically, the seatbelt 94 is wound around a spool 96 of the retractor 90 when it is not in use. A spool sensor 97 is used to determine whether the seatbelt 94 is fully extracted from the spool 96. In one example, the spool sensor 97 is an optical sensor that is directed toward the spool 96 to determine whether the seatbelt 94 is present on the spool 96, indicating that the seatbelt 94 is not fully extracted. To dispense the seatbelt 94, a user pulls the seatbelt 94 away from the retractor 90 in an extension direction 98. As the seatbelt 94 is dispensed, the spool 96 rotates with respect to a frame 99 of the retractor 90 in a first direction 100.

To retract the seatbelt 94, the user unbuckles the seatbelt 94 and allows it to return to the retractor 90. The spool 96 may be connected to a spring (not shown) so that the seatbelt 94 automatically returns to the retractor 90 and winds around the spool 96. The spool 96 rotates in a second direction 101 opposite the first direction 100 as the seatbelt 94 is retracted.

The spool 96 is operably connected to a control disc 102 of the retractor 90 such that, when a pawl 92 of the retractor 90 is engaged with the control disc 102, the control disc 102 prevents rotation of the spool 96 in the first direction 100 while allowing rotation of the spool 96 in the second direction 101. The control disc 102 is rotatable with respect to the retractor frame 99. The control disc 102 rotates in a third direction 103 when the spool 96 rotates in the first direction 100 corresponding to seatbelt extension. The control disc 102 rotates in a fourth direction opposite of the third direction 103 when the spool 96 rotates in the second direction 101 corresponding to seatbelt retraction.

The pawl 92 includes an actuating arm 92a and an engagement arm 92b. The actuating arm 92a is coupled to a pawl actuator 104 so that linear movement of the pawl actuator 104 causes the pawl 92 to pivot about a pivot point 105. A pawl sensor 106 is disposed in close proximity to the pawl 92 and determines whether the pawl 92 is in an engaged state (FIG. 4B) or a disengaged state (FIG. 4A). A BCM such as the BCM 32 of FIGS. 1 and 2 controls the pawl actuator 104 to move the pawl 92 from the disengaged state to the engaged state based on input from the spool sensor 97 (indicating that the seatbelt 94 is fully extracted from the spool 96), a manual disengagement sensor such as the manual disengagement sensor 34 of FIGS. 1 and 2, and/or a UID such as the UID 35 of FIGS. 1 and 2.

In the engaged state, the engagement arm 92B of the pawl 92 engages teeth 107 on the control disc 102, which prevents the control disc 102 from rotating in the third direction 103 while allowing the control disc 102 to rotate in the fourth direction. As a result, the spool 96 is prevented from rotating in the first direction 100 and is allowed to rotate in the second direction 101. Thus, in the engaged state, the retractor 90 can retract the seatbelt 94 onto the spool 96, but the user cannot extend the seatbelt 94 from the retractor 90. The BCM controls the pawl actuator 104 to move the pawl 92 from the engaged state to the disengaged state based on input from a buckle sensor, a manual disengagement sensor, a camera, a weight pad, and a UID such as the buckle sensor 24, manual disengagement sensor 34, the camera 36, the weight pad 38, and the UID 35 of FIGS. 1 and 2, respectively. In the disengaged state, the user can extend the seatbelt 94 from the retractor 90.

The pawl actuator 104 disengages the pawl 92 from the teeth 107 on the control disc 102 by moving in a fifth direction 108, which causes the pawl 92 to pivot about the pivot point 29 from the engaged state to the disengaged state. The pawl actuator 104 engages the pawl 92 with the teeth 107 on the control disc 102 by moving in a sixth direction 109 (FIG. 4A) opposite of the fifth direction 108, which causes the pawl 92 to pivot about the pivot point 105 from the engaged state to the disengaged state.

Figure 5:
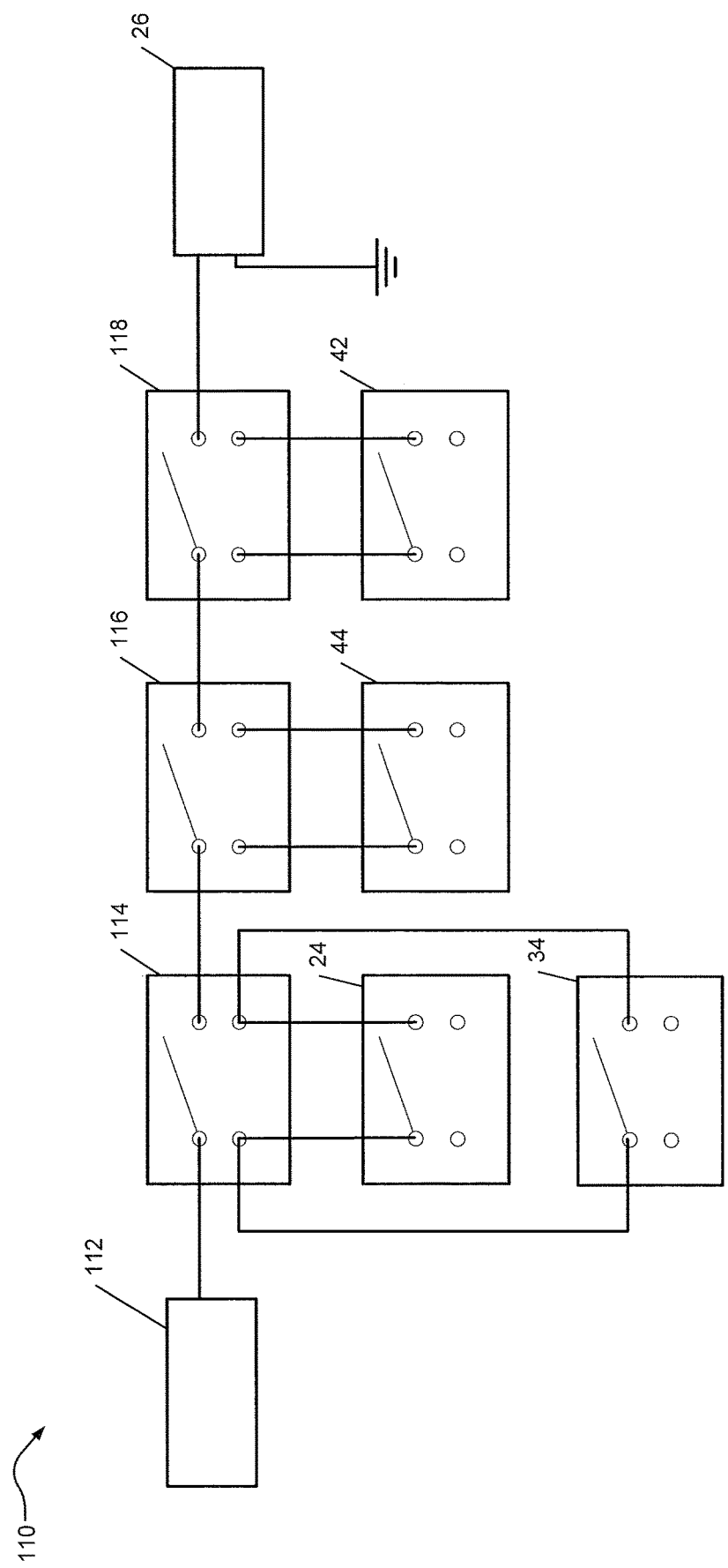
FIG. 5 is a schematic diagram of an example electrical circuit for controlling the power supply to an actuator that is operable to disengage the locking retractor of FIGS. 3A and 3B according to the principles of the present disclosure.

Referring now to FIG. 5, a schematic diagram of an example implementation of an electrical circuit 110 that may be included in the vehicle system 10 of FIG. 1. In the example of FIG. 5, the buckle sensor 24, the manual disengagement sensor 34, the pawl sensor 42, and the ignition switch 44 are shown as switches. The buckle switch 24 closes when the seatbelt tongue 18 is disengaged from the buckle 20 and/or the seatbelt button 22 is pressed. The manual disengagement switch 34 closes when the manual disengagement button 33 is pressed. The pawl switch 42 closes when the pawl 28 is engaged with the control disc 30 (or when the pawl 92 is engaged with the control disc 102). The ignition switch 44 closes when the ignition switch 44 is in the ON position.

The electrical circuit 110 includes a power source 112, such as a vehicle battery, and a plurality of switches connected in series between the power source 112 and the pawl actuator 26. The plurality of switches includes a first switch 114, a second switch 116, and a third switch 118. The power source 112 supplies power the pawl actuator 26 when each of the switches 114, 116, and 118 is closed. The pawl actuator 26 receives power from the power source 112 only when each of the switches 114, 116, 118 is closed.

The buckle switch 24 and the manual disengagement button switch 34 are electrically connected to the first switch 114 in parallel such that the first switch 114 closes when either one of the buckle switch 24 or the manual disengagement switch 34 closes. The ignition switch 44 is electrically connected to the second switch 116 such that the second switch 116 closes when the ignition switch 44 closes. The pawl switch 42 is electrically connected to the third switch 118 such that the third switch 118 closes when the pawl switch 42 closes.

Thus, the power source 112 only supplies power the pawl actuator 26 when at least one of the buckle switch 24 and the manual disengagement switch 34 is closed and each of the ignition switch 44 and the pawl switch 42 is closed. Supplying power to the pawl actuator 26 only when the ignition switch 44 and the pawl switch 42 are closed reduces parasitic currents when the ignition switch 44 is in the OFF position and/or the pawl 28 is disengaged from the control disc. Supplying power to the pawl actuator 26 only when the buckle switch 24 or the manual disengagement switch 34 is closed enables the electrical circuit 110 to control the pawl actuator 26 independent of the BCM 32. In this regard, the pawl actuator 26 may disengage the pawl 28 from the control disc 30 when power is supplied to the pawl actuator 26. Alternatively, the pawl actuator 26 may only disengage the pawl 28 from the control disc 30 when commanded to do so by the BCM 32 regardless of whether power is supplied to the pawl actuator 26.

As explained above, the electrical circuit 110 controls whether power is supplied to the pawl actuator 26 based on the state of the buckle switch 24, manual disengagement switch 34, ignition switch 44, and the pawl switch 42, and independent of the BCM 32. However, in various implementations, the switches 114, 116, and 118 may be replaced by a single switch (not shown), and the BCM 32 may control whether power is supplied to the pawl actuator 26 by opening or closing the switch. The BCM 32 may open or close the switch based on the inputs from the buckle switch 24, the manual disengagement button switch 34, the pawl switch 42, and/or the ignition switch 44. For example, the BCM 32 may close the switch when the buckle switch 24 is closed, the pawl switch 42 is closed, and the ignition switch 44 is closed.

In implementations where the BCM 32 controls whether power is supplied to the pawl actuator 26, the buckle sensor 24, the manual disengagement sensor 34, the pawl sensor 42, and/or the ignition sensor 44 may not be switches. In other words, the buckle sensor 24, the manual disengagement sensor 34, the pawl sensor 42, and/or the ignition sensor 44 may have an analogue or variable voltage output rather than a digital voltage output. In this case, the BCM 32 may supply power to the pawl actuator 26 when the input from the buckle sensor 24, the manual disengagement sensor 34, the pawl sensor 42, and/or the ignition sensor 44 is greater than a threshold (e.g., a predetermined value).

In various implementations, the BCM 32 and/or the electrical circuit 110 may not supply power to the pawl actuator 26 when vehicle vibration is greater than a threshold while the vehicle is in motion. Additionally or alternatively, the BCM 32 and/or the electrical circuit 110 may include de-bounce logic or a filter so that a brief opening of the buckle switch 24 (e.g., less than or equal to 250 milliseconds (ms)) does not cut off power to the pawl actuator 26.

With reference to FIG. 6, an example method for controlling disengagement of the pawl 28 from the control disc 30 in the retractor 90 begins at 140. The method is described in the context of the modules included in the example implementation of the BCM 32 shown in FIG. 2. However, the particular modules that perform the steps of the method may be different than those mentioned below and/or the method may be implemented apart from the modules of FIG. 2. In addition, while the method is described with reference to the retractor 16 and the pawl actuator 26 of FIGS. 3A and 3B, the method may be performed in conjunction with the retractor 90 and the pawl actuator 104 of FIGS. 4A and 4B.

At 142, the pawl actuator control module 62 determines whether the ignition switch 44 is in the ON position. If the ignition switch 44 is in the ON position, the method continues at 143. Otherwise, the method continues at 144.

At 143, the pawl actuator control module 62 determines whether the pawl 28 is engaged with the control disc 30. The pawl actuator control module 62 determines whether the pawl 28 is engaged with the control disc 30 or disengaged from the control disc 30 based on input from the pawl sensor 42. If the pawl 28 is engaged with the control disc 30, the method continues at 145. Otherwise, the method continues at 144.

At 144, the pawl actuator control module 62 does not supply power to the pawl actuator 26. The method returns to 142. At 145, the pawl actuator control module 62 supplies power to the pawl actuator 26. The method continues at 146.

At 146, the pawl actuator control module 62 determines whether the vehicle is stationary. The pawl actuator control module 62 determines whether the vehicle is stationary based on the speed of the vehicle. If the vehicle is stationary, the method continues at 147. Otherwise, the method continues at 148.

Figure 6A:
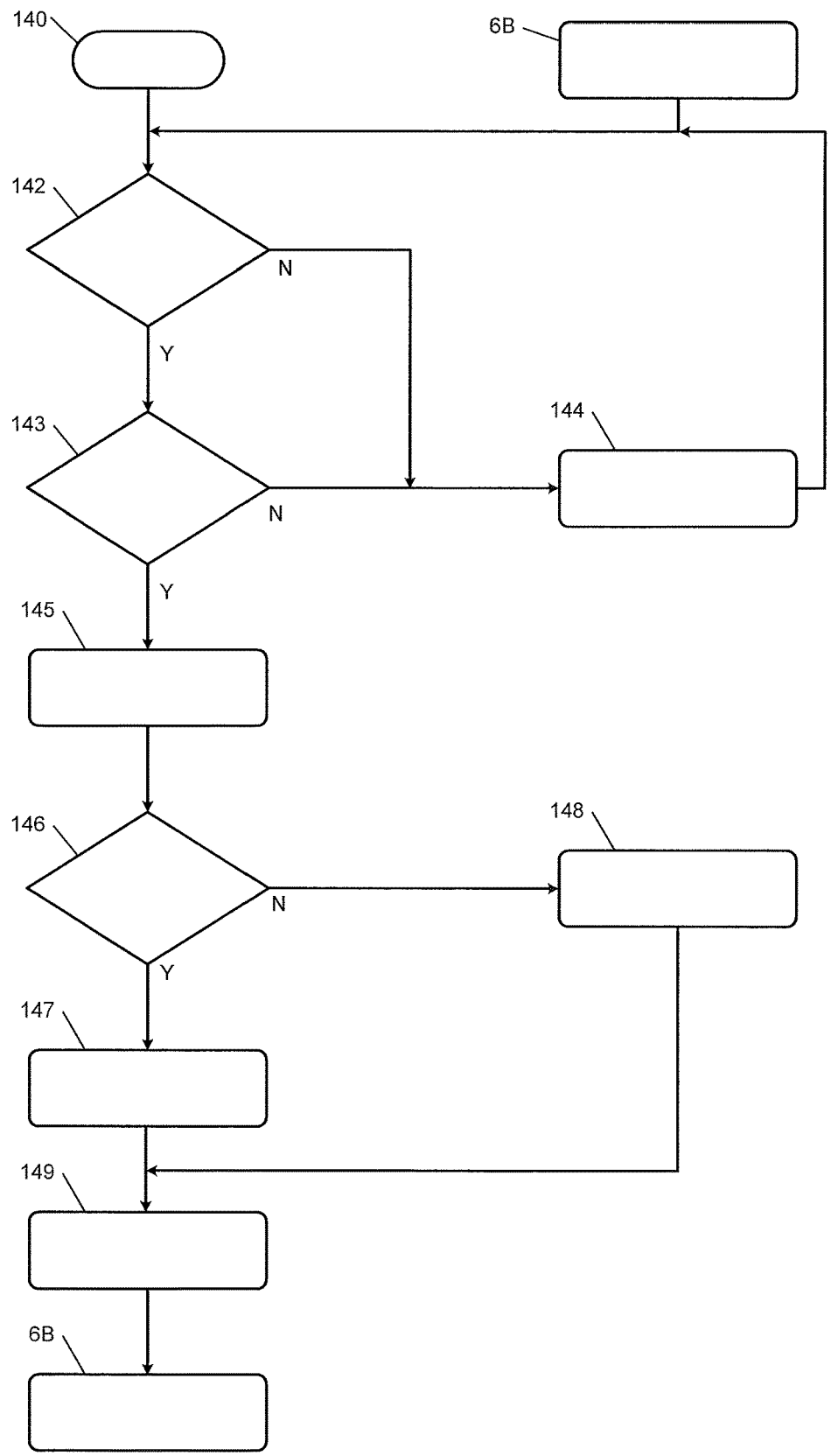
FIGS. 6A and 6B are flowcharts illustrating an example control method for disengaging a pawl of the seatbelt retractor of FIGS. 3A and 3B to permit extension of a seatbelt according to the principles of the present disclosure.
Figure 6B:
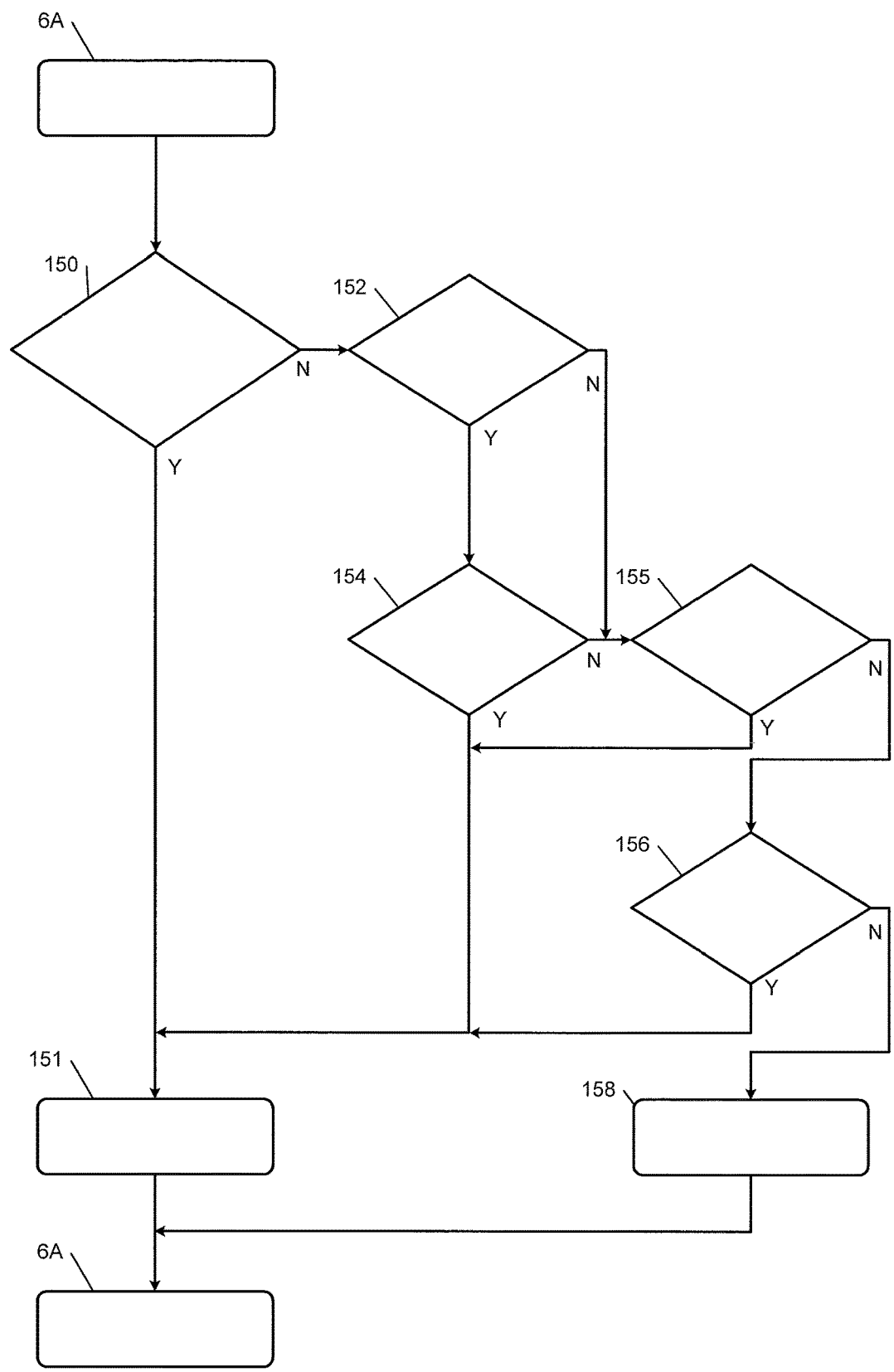

At 147, the pawl actuator control module 62 sets the frequency threshold of the low-pass filter to the first frequency threshold. The method continues at 149. At 148, the pawl actuator control module 62 sets the frequency threshold of the low-pass filter to the second frequency threshold. The method continues at 149. At 149, the pawl actuator control module 62 filters raw signals (e.g., the BS signal) to produce filtered signals by removing the content of signals that have frequencies that are greater than the first or second frequency threshold. The method continues at 150 (FIG. 6B).

At 150, the pawl actuator control module 62 determines whether the seatbelt tongue 18 is disengaged from the buckle 20 of the seatbelt 14 and/or the seatbelt button 22 of the buckle 20 is pressed to unlatch the seatbelt 14. The pawl actuator control module 62 determines whether the tongue 18 is disengaged from the buckle 20 and/or the seatbelt button 22 of the buckle 20 of the seatbelt 14 is pressed based on filtered input from the buckle sensor 24. If the tongue 18 is disengaged from the buckle 20 and/or seatbelt button 22 is pressed, the method continues at 151. Otherwise, the method continues at 152.

At 151, the pawl actuator control module 62 disengages the pawl 28 from the control disc 30 using the pawl actuator 26 to permit extension of the seatbelt 14 from the retractor 16. The method continues at 142 (FIG. 6A). At 152, the pawl actuator control module 62 determines whether the manual disengagement button 33 is pressed. The pawl actuator control module 62 determines whether the manual disengagement button 33 is pressed based on input from the manual disengagement sensor 34. If the manual disengagement button 33 is pressed, the method continues at 154. Otherwise, the method continues at 155.

At 154, the pawl actuator control module 62 determines whether the vehicle transmission is in park. The pawl actuator control module 62 determines whether the vehicle is in park based on input from the gear selector sensor 45. If the vehicle transmission is in park, the method continues at 151. Otherwise, the method continues at 155.

At 155, the occupant detection module 60 determines whether a human occupant is present on the seat 12 without a child safety seat. The occupant detection module 60 determines whether a human occupant is present on the seat 12 without a child safety seat based on input from the camera 36 and/or the weight pad 38 as described above. If the occupant detection module 60 detects an occupant on the seat 12 without a child safety seat, the method continues at 151. Otherwise, the method continues at 156.

At 156, the pawl actuator control module 62 determines whether the user issues a command to disengage the pawl 28 to permit extension of the seatbelt 14 from the retractor. The pawl actuator control module 62 determines whether the user issues a disengage pawl command based on input from the UID 35. The user may issue a disengage pawl command through the UID 35 by pressing a button, interacting with a touchscreen, or using a verbal command. If the pawl actuator control module 62 determines that the user issues a disengage pawl command, the method continues at 151. Otherwise, the method continues at 158. At 158, the pawl actuator control module 62 does not disengage the pawl 28 with the control disc 30 using the pawl actuator 26. The method returns to 142 (FIG. 6A).

Figure 7:
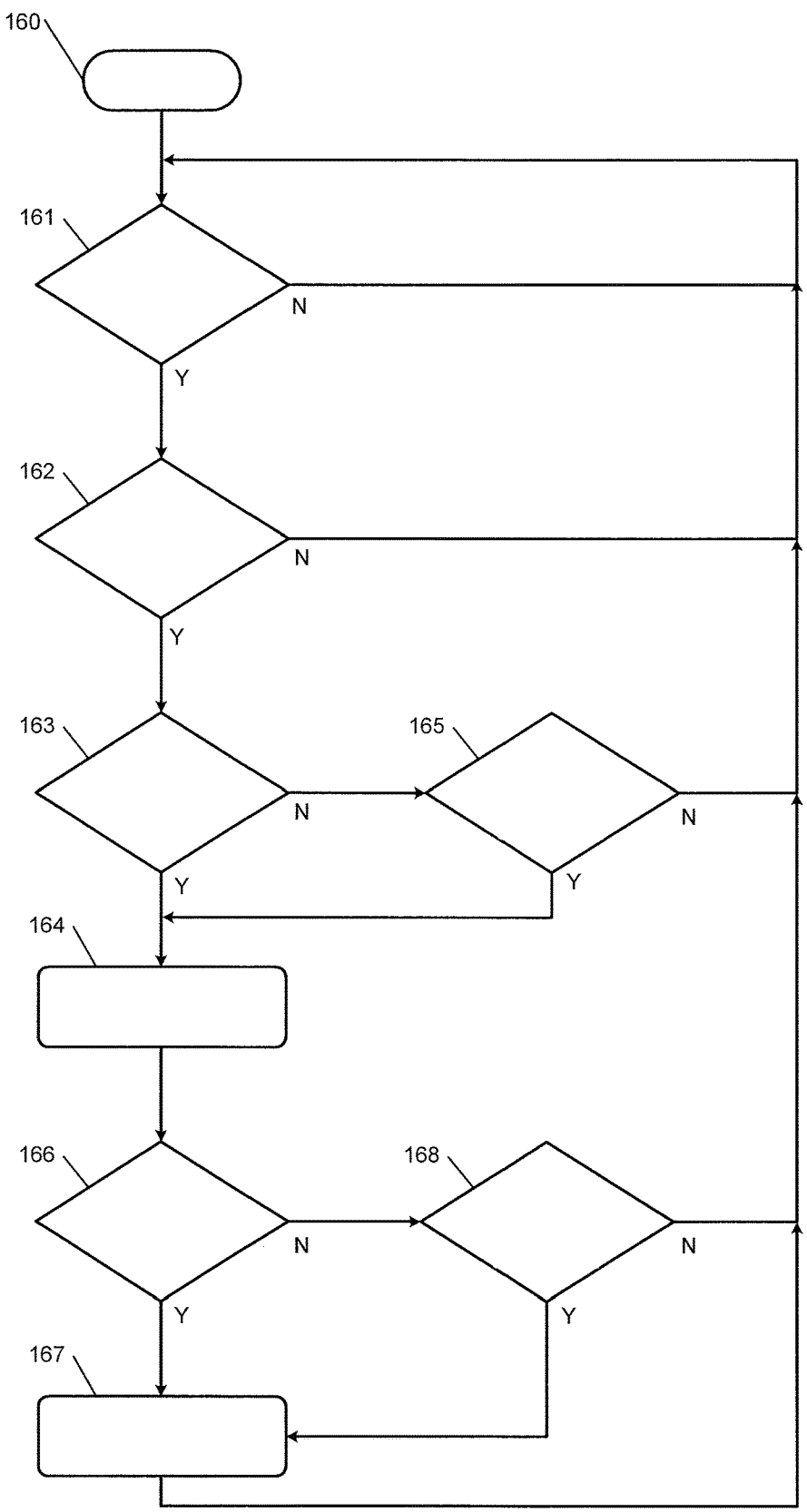
FIG. 7 is a flowchart illustrating an example control method for engaging and disengaging a pawl of the seatbelt retractor of FIGS. 4A and 4B to prevent or permit extension of a seatbelt, respectively, according to the principles of the present disclosure.

Referring to FIG. 7, an example method for controlling the pawl actuator 104 to engage or disengage the pawl 92 from the control disc 102 in the retractor 90 of FIGS. 4A-4B begins at 160. The method is described in the context of the modules included in the example implementation of the BCM 32 shown in FIG. 2. However, the particular modules that perform the steps of the method may be different than those mentioned below and/or the method may be implemented apart from the modules of FIG. 2.

At 161, the pawl actuator control module 62 determines whether the seatbelt tongue 18 is secured in the buckle 20. The pawl actuator control module 62 determines whether the tongue is secured it the buckle 20 based on an input from the buckle sensor 24. If the tongue 18 is secured in the buckle 20, the method continues at 162. Otherwise, the method returns to 161.

At 162, the pawl actuator control module 62 determines whether the vehicle transmission is in park. The pawl actuator control module 62 determines whether the vehicle is in park based on input from the gear selector sensor 45. If the vehicle transmission is in park, the method continues at 163. Otherwise, the method returns to 161.

At 163, the pawl actuator control module 62 determines whether the user has fully extracted the seatbelt 94 from the spool 96. The pawl actuator control module 62 determines whether the user has fully extracted the seatbelt 94 from the spool 96 based on input from the spool sensor 97. If the user has fully extracted the seatbelt 94 from the spool 96, the method continues at 164. Otherwise, the method continues at 165. At 164, the pawl actuator control module 62 engages the pawl 92 using the pawl actuator 104. The method continues at 166.

At 165, the pawl actuator control module 62 determines whether the user issues a command to engage the pawl 92 with the control disc 102 to prevent extension of the seatbelt 94 from the retractor 90. The pawl actuator control module 62 determines whether the user issues an engage pawl command based on an input from the UID 35 and/or the manual disengagement sensor 34. If the user issues an engage pawl command, the method continues at 164. Otherwise, the method returns to 161.

At 166, the pawl actuator control module 62 determines whether the user has fully retracted the seatbelt 94. The pawl actuator control module 62 determines whether the user has fully retracted the seatbelt 94 based on input from the spool sensor 97. If the user has fully retracted the seatbelt 94, the method continues at 167. Otherwise, the method continues at 168. At 167, the pawl actuator control module 62 disengages the pawl 92 from the control disc 102 using the pawl actuator 104. The method returns to 161.

At 168, the pawl actuator control module 62 determines whether the user issues a command to disengage the pawl 92 from the control disc 102 to permit extension of the seatbelt 94. The pawl actuator control module 62 determines whether the user issues a disengage pawl command based on input from the UID 35 and/or the manual disengagement sensor 34. If the pawl actuator control module 62 determines that the user issues a disengage pawl command, the method continues at 167. Otherwise, the method returns to 161.

Figure 8:
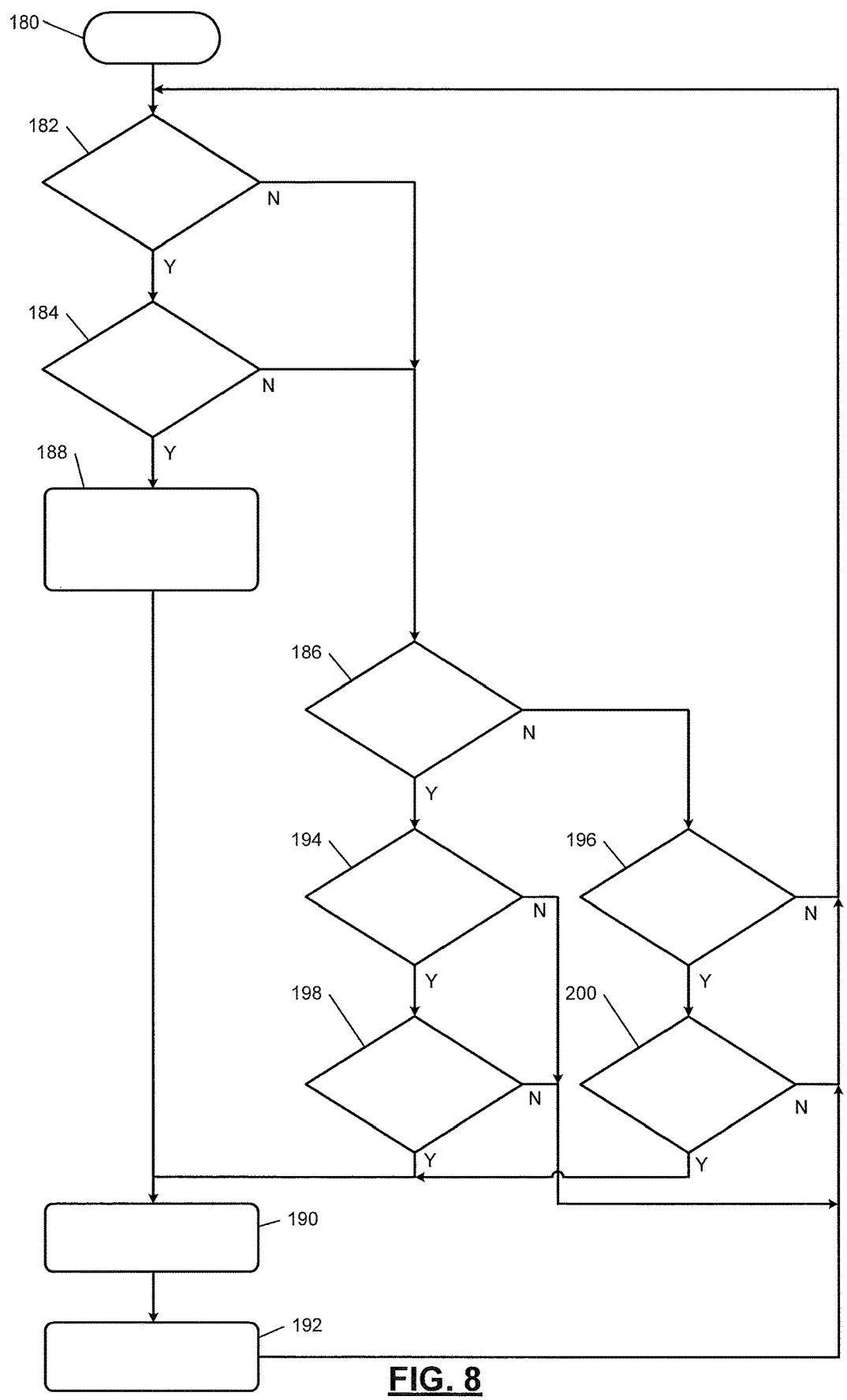
FIG. 8 is a flowchart illustrating an example control method for generating a message indicating that the pawl of the retractor of FIGS. 3A and 3B is engaged according to the principles of the present disclosure.

Referring now to FIG. 8, an example method for generating a message indicating that the pawl 28 is engaged with the control disc 30 begins at 180. The method is described in the context of the modules included in the example implementation of the BCM 32 shown in FIG. 2 and the retractor 16 of FIGS. 3A and 3B. However, the particular modules that perform the steps of the method may be different than those mentioned below and/or the method may be implemented apart from the modules of FIG. 2. Moreover, the method may alternatively be performed with respect to the retractor 90 of FIGS. 4A and 4B.

At 182, the pawl engagement detection module 64 determines whether the buckle sensor 24 is in the OFF position (or whether the buckle switch 24 is open), indicating that the seatbelt 14 is unbuckled or the tongue 18 is not engaged in the buckle 20. If the buckle sensor 24 is in the OFF position, the method continues at 184. Otherwise, the method continues at 186.

At 184, the pawl engagement detection module 64 detects whether the pawl sensor 42 is in the ON position (or whether the pawl switch 42 is closed), indicating that the pawl 28 is engaged with the control disc 30. If the pawl sensor 42 is in the ON position, the method continues at 188. Otherwise, the method continues at 186.

At 188, the pawl engagement detection module 64 diagnoses undesired engagement of the pawl 28 with the control disc 30 and/or a fault of the buckle sensor 24. If the tongue 18 of the seatbelt 14 is not engaged in the buckle 20, engagement of the pawl 28 with the control disc 30 to prevent extension of the seatbelt 14 may not be desired. Alternatively, engagement of the pawl 28 with the control disc 30 may be desired when seatbelt 14 is buckled. In this situation, the buckle sensor 24 may improperly indicate that the buckle sensor 24 is in the OFF position (e.g., a wire between the buckle sensor 24 and the BCM 32 may be broken).

The method continues at 190. At 190, the message communication module 66 controls the UID 35 to warn the driver that the pawl 28 is engaged with the control disc 30. The message communication module 66 may warn the driver by displaying a message, flashing a light in the cabin 11, playing a sound, flashing the headlights, or sounding the vehicle alarm. The method continues at 192. At 192, the message communication module 66 generates a wireless signal indicating that the pawl 28 is engaged with the control disc 30. The message communication module 66 may transmit the wireless signal to the satellite communication network 40 to warn a third party (e.g., emergency personnel) that the locking mechanism in the retractor 16 is activated. The method returns to 182.

At 186, the occupant detection module 60 determines whether the seat 12 is occupied by a human passenger (as opposed to a child safety seat). The pawl engagement detection module 64 determines whether the seat 12 is occupied based on inputs from the camera 36 and the weight pad 38, as discussed above. If the seat 12 is occupied by a human passenger, the method continues at 194. Otherwise, the method continues at 196.

At 194, the pawl engagement detection module 64 detects whether the buckle sensor 24 is in the ON position, indicating that the seatbelt 14 is buckled. If the buckle sensor 24 is in the ON position, the method continues at 198. Otherwise, the method returns to 182.

At 198, the pawl engagement detection module 64 determines whether the pawl 28 changes state from disengaged to engaged. More specifically, the pawl engagement detection module 64 detects whether the pawl sensor 42 changes from OFF to ON. A change in the state of the pawl sensor 42 from OFF to ON while the seat 12 is occupied by a human passenger and the seatbelt 14 is buckled indicates that pawl engagement is undesired. If the pawl sensor 42 state changes from OFF to ON, the method continues at 190. Otherwise, the method returns to 182.

At 196, the pawl engagement detection module 64 detects whether the tongue 18 of the seatbelt 14 is engaged in the buckle 20 based on input from the buckle sensor 24. If the buckle sensor 24 is in the OFF position, the method continues at 200. Otherwise, the method returns to 182.

At 200, the pawl engagement detection module 64 determines whether the pawl 28 changes state from disengaged to engaged. More specifically, the pawl engagement detection module 64 detects whether the pawl sensor 42 changes from OFF to ON. A change in the state of the pawl sensor 42 from OFF to ON while the seatbelt 14 is buckled indicates that pawl engagement is undesired. If the pawl sensor 42 state changes from OFF to ON, the method continues at 190. Otherwise, the method returns to 182.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a pawl actuator control module configured to electronically control a pawl actuator of a seatbelt retractor in a vehicle to disengage a pawl of the seatbelt retractor from a control disc of the seatbelt retractor when at least one of:
   a manual disengagement button is pressed, wherein the manual disengagement button is spaced from a buckle of a seatbelt;
   an occupant is present in a seat of the vehicle; and
   a user provides an instruction to disengage the pawl via a user interface device, wherein the seatbelt retractor allows the seatbelt to be extracted from the seatbelt retractor when the pawl is disengaged from the control disc, and the seatbelt retractor prevents the seatbelt from being extracted from the seatbelt retractor when the pawl is engaged with the control disc.

2. The system of claim 1 further comprising a buckle sensor configured to detect whether a button on the seatbelt buckle is pressed, wherein the pawl actuator control module is configured to control the pawl actuator to disengage the pawl from the control disc when the button on the seatbelt buckle is pressed.

3. The system of claim 1 further comprising a manual disengagement sensor configured to detect whether the manual disengagement button is pressed, wherein the pawl actuator control module is configured to control the pawl actuator to disengage the pawl from the control disc when the manual disengagement button is pressed.

4. The system of claim 3 wherein the pawl actuator control module is configured to control the pawl actuator to disengage the pawl from the control disc when both the manual disengagement button is pressed and a transmission of the vehicle is in park.

5. The system of claim 1 further comprising an occupant detection module configured to determine whether an occupant is present in the seat, wherein the pawl actuator control module controls the pawl actuator to disengage the pawl from the control disc when an occupant is present in the seat.

6. The system of claim 1 wherein the pawl actuator control module is configured to control the pawl actuator to disengage the pawl from the control disc when the user provides the instruction to disengage the pawl via the user interface device.

7. The system of claim 1 wherein the pawl actuator control module is configured to control the pawl actuator of the seatbelt retractor to engage the pawl of the seatbelt retractor with the control disc of the seatbelt retractor when at least one of:
   the user provides an instruction to engage the pawl via the user interface device; and
   the user fully extracts the seatbelt from the seatbelt retractor.

8. The system of claim 1 wherein the pawl actuator control module is configured to control whether power is supplied to the pawl actuator based on at least one of:
   whether the pawl is engaged with the control disc; and
   whether an ignition switch is in an ON position.

9. The system of claim 8 further comprising a retractor sensor configured to detect whether the pawl is engaged, wherein the pawl actuator control module is configured to supply power to the pawl actuator when the pawl is engaged with the control disc and the ignition switch is in the ON position.

10. The system of claim 1 further comprising a buckle sensor configured to detect whether a tongue of the seatbelt is disengaged from the buckle of the seatbelt or a button on the seatbelt buckle is pressed, wherein:
   the pawl actuator control module is configured to receive a raw signal from the buckle sensor;
   the pawl actuator control module is configured to filter the raw signal to produce a filtered signal by removing content of the raw signal that has a frequency greater than a frequency threshold;
   the pawl actuator control module is configured to determine whether the tongue of the seatbelt is disengaged from the seatbelt buckle or the button on the seatbelt buckle is pressed based on the filtered signal; and
   the pawl actuator control module is configured to control the pawl actuator to disengage the pawl from the control disc based on the filtered signal.

11. The system of claim 10 wherein the pawl actuator control module is configured to adjust the frequency threshold based on whether the vehicle is stationary.

12. The system of claim 11 wherein:
   when the vehicle is stationary, the pawl actuator control module sets the frequency threshold to a first frequency threshold; and
   when the vehicle is moving, the pawl actuator control module sets the frequency to a second frequency threshold that is less than the first frequency threshold.

13. A system comprising:
a pawl sensor configured to detect whether a pawl of a seatbelt retractor associated with a seat of a vehicle is engaged with a control disc of the seatbelt retractor, wherein the seatbelt retractor allows a seatbelt to be extracted from the seatbelt retractor when the pawl is disengaged from the control disc, and the seatbelt retractor prevents the seatbelt from being extracted from the seatbelt retractor when the pawl is engaged with the control disc; and
a message communication module configured to generate a message indicating that the pawl is engaged with the control disc based on an input from the pawl sensor.

14. The system of claim 13 further comprising a buckle sensor configured to detect whether a tongue of the seatbelt is secured in a seatbelt buckle associated with the seat, wherein the message communication module is configured to generate the message when the pawl sensor indicates that the pawl is engaged and the buckle sensor indicates that the seatbelt tongue is not secured in the seatbelt buckle.

15. The system of claim 13 further comprising:
a buckle sensor configured to detect whether a tongue of the seatbelt is secured in a seatbelt buckle associated with the seat; and
an occupant detection module configured to determine whether an occupant is present in the seat, wherein the message communication module is configured to generate the message when an occupant is present in the seat, the buckle sensor indicates that the seatbelt tongue is secured in the seatbelt buckle, and the pawl sensor switches from indicating that the pawl is disengaged to indicating that the pawl is engaged.

16. The system of claim 13 further comprising:
a buckle sensor configured to detect whether a tongue of the seatbelt is secured in a seatbelt buckle associated with the seat; and
an occupant detection module configured to determine whether an occupant is present in the seat, wherein the message communication module is configured to generate the message when an occupant is not present in the seat, the buckle sensor indicates that the seatbelt tongue is not secured in the seatbelt buckle, and the pawl sensor switches from indicating that the pawl is disengaged to indicating that the pawl is engaged.

17. A system comprising:

a seatbelt retractor including a control disc and a pawl, the seatbelt retractor allowing a seatbelt to be extracted from the seatbelt retractor when the pawl is disengaged from the control disc, the seatbelt retractor preventing the seatbelt from being extracted from the seatbelt retractor when the pawl is engaged with the control disc; and an electrical circuit including a power source, a pawl actuator, and at least one of a buckle switch and a manual disengagement switch, the buckle switch being configured to close when a button of a seatbelt buckle is pressed, and the manual disengagement switch being configured to close when a manual disengagement button is pressed, wherein:

the at least one of the buckle switch and the manual disengagement switch is electrically connected to the power source and the pawl actuator;

the pawl actuator is configured to disengage the pawl from the control disc when it receives power from the power source; and the pawl actuator does not receive power from the power source when the at least one of the buckle switch and the manual disengagement switch is open.

18. The system of claim 17 wherein:

the electrical circuit includes the power source, the pawl actuator, the buckle switch, the manual disengagement switch, and a first switch;

the power source, the first switch, and the pawl actuator are connected in series; and the buckle switch and the manual disengagement switch are connected in parallel with the first switch such that the first switch closes when at least one of the buckle switch and the manual disengagement switch closes.

19. The system of claim 17 wherein:

the electrical circuit further includes an ignition switch that is electrically connected to the power source, the pawl actuator, and the at least one of the buckle switch and the manual disengagement switch;

the ignition switch is configured to close when the ignition switch is in an ON position; and the pawl actuator does not receive power from the power source when the ignition switch is open.

20. The system of claim 17 wherein:

the electrical circuit further includes a pawl switch that is electrically connected to the power source, the pawl actuator, and the at least one of the buckle switch and the manual disengagement switch;

the pawl switch is configured to close when the pawl is engaged with the control disc; and the pawl actuator does not receive power from the power source when the pawl switch is open.

\* \* \* \* \*